(12) United States Patent
Kim et al.

(10) Patent No.: US 9,984,325 B1
(45) Date of Patent: May 29, 2018

(54) LEARNING METHOD AND LEARNING DEVICE FOR IMPROVING PERFORMANCE OF CNN BY USING FEATURE UPSAMPLING NETWORKS, AND TESTING METHOD AND TESTING DEVICE USING THE SAME

(71) Applicant: StradVision, Inc., Gyeongsangbuk-do (KR)

(72) Inventors: Yongjoong Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-Do (KR)

( * ) Notice: Subject to any disclaimer, the term of this patent is extended or adjusted under 35 U.S.C. 154(b) by 0 days. days.

(21) Appl. No.: 15/724,643

(22) Filed: Oct. 4, 2017

(51) Int. Cl.
   *G06K 9/00* (2006.01)
   *G06N 3/08* (2006.01)
   *G06N 3/04* (2006.01)
   *G06K 9/66* (2006.01)

(52) U.S. Cl.
   CPC .............. *G06N 3/08* (2013.01); *G06K 9/66* (2013.01); *G06N 3/04* (2013.01); *G06T 2207/20081* (2013.01)

(58) Field of Classification Search
   CPC ... G06N 3/04; G06N 3/08; G06K 9/66; G06T 2207/20081; G06T 2207/20084; G06T 3/4046
   See application file for complete search history.

(56) References Cited

U.S. PATENT DOCUMENTS

| | | | |
|---|---|---|---|
| 7,643,702 B1 * | 1/2010 | Brandt | G06K 9/00986 382/190 |
| 9,710,697 B2 * | 7/2017 | Tang | G06K 9/00268 |
| 9,824,294 B2 * | 11/2017 | Ruan | G06K 9/4676 |
| 9,830,529 B2 * | 11/2017 | Jetley | G06K 9/6256 |

(Continued)

*Primary Examiner* — Wesley J Tucker
(74) *Attorney, Agent, or Firm* — Husch Blackwell LLP

(57) ABSTRACT

A learning method for improving performance of a CNN by using Feature Up-sampling Networks is disclosed. The learning method includes steps of: (a) allowing the down-sampling block to acquire a down-sampling image; (b) allowing each of a (1-1)-th to a (1-k)-th filter blocks to respectively acquire each of a (1-1)-th to a (1-k)-th feature maps; (c) allowing a specific up-sampling block to (i) receive a particular feature map from its corresponding filter block, and (ii) receive another specific feature map from its previous up-sampling block, and then rescale a size of the specific feature map to be identical to that of the particular feature map and (iii) apply certain operations to the particular feature map and the resealed specific feature map to generate a feature map of the specific up-sampling block; and (d)(i) allowing an application block to acquire an application-specific output and (ii) performing a first backpropagation process.

24 Claims, 9 Drawing Sheets

(56) References Cited

U.S. PATENT DOCUMENTS

| | | | | |
|---|---|---|---|---|
| 9,836,853 | B1* | 12/2017 | Medioni | G06T 7/2033 |
| 2015/0363634 | A1* | 12/2015 | Yin | G06K 9/00221 |
| | | | | 382/118 |
| 2017/0124409 | A1* | 5/2017 | Choi | G06N 3/0454 |
| 2017/0147905 | A1* | 5/2017 | Huang | G06K 9/6232 |
| 2017/0286776 | A1* | 10/2017 | Min | G06K 9/00718 |
| 2017/0345130 | A1* | 11/2017 | Wang | G06T 3/4053 |
| 2017/0374374 | A1* | 12/2017 | Wang | H04N 19/33 |

* cited by examiner

US 9,984,325 B1

LEARNING METHOD AND LEARNING DEVICE FOR IMPROVING PERFORMANCE OF CNN BY USING FEATURE UPSAMPLING NETWORKS, AND TESTING METHOD AND TESTING DEVICE USING THE SAME

FIELD OF THE INVENTION

The present invention relates to a learning method and a learning device for improving performance of a CNN by using Feature Up-sampling Networks (FUN), and a testing method and a testing device using the same, more particularly, to the learning method including steps of: (a) the learning device, if an input image is obtained, allowing a down-sampling block to acquire a down-sampling image by applying a predetermined operation to the input image for reducing a size thereof; (b) the learning device, if the down-sampling image is obtained, allowing each of a (1-1)-th to a (1-k)-th filter blocks to respectively acquire each of a (1-1)-th to a (1-k)-th feature maps by applying one or more convolution operations to the down-sampling image; (c) the learning device (I) allowing a (2-1)-th up-sampling block to (i) receive the down-sampling image from the down-sampling block, and (ii) receive a (2-2)-th feature map from a (2-2)-th up-sampling block, and then rescale a size of the (2-2)-th feature map to be identical to that of the down-sampling image and (iii) apply a certain operation to the down-sampling image and the (2-2)-th resealed feature map, thereby acquiring a (2-1)-th feature map, and (II) allowing a (2-(M+1))-th up-sampling block to (i) receive the (1-M)-th feature map from the (1-M)-th filter block, and (ii) receive a (2-(M+2))-th feature map from a (2-(M+2))-th up-sampling block, and then rescale a size of the (2-(M+2))-th feature map to be identical to that of the (1-M)-th feature map and (iii) apply a certain operation to the (1-M)-th feature map and the (2-(M+2))-th resealed feature map in order to generate the (2-(M+1))-th feature map, thereby acquiring a (2-k)-th to a (2-2)-th feature maps, wherein M is an integer greater than or equal to 1; and (d) the learning device (i) allowing an application block to acquire an application-specific output by applying an application-specific operation to at least part of the (2-k)-th to the (2-1)-th feature maps and (ii) allowing an application-specific loss block to acquire a loss by comparing the application-specific output to GT; and thereby adjusting parameters of at least part of the application block, the (2-k)-th to the (2-1)-th up-sampling blocks and the (1-1)-th to the (1-k)-th filter blocks by using the loss during a first backpropagation process; and the learning device, the testing method and the testing device using the same.

BACKGROUND OF THE INVENTION

Deep Convolution Neural Networks, or Deep CNN, is the core of the remarkable development in the field of Deep Learning. Though the CNN has been employed to solve character recognition problems in 1990s, it is not until recently that the CNN has become widespread in Machine Learning. Due to the recent researches, the CNN has been a very useful and powerful tool in the field of Machine Learning. For example, in 2012, the CNN significantly outperformed its competitors in an annual software contest, the ImageNet Large Scale Visual Recognition Challenge, and won the contest.

FIG. 1 is a block diagram of a device adopting the CNN according to prior art.

Referring to FIG. 1, the device 100 includes a feature computation block 101, an application block 102, and an application-specific loss block 103.

Upon receiving an input image, the feature computation block 101 including one or more convolution blocks and Feature Pyramid Networks (FPN) blocks may generate feature maps from the input image. For a reference, each of the convolution blocks may be comprised of various layers such as convolutional layer, pooling layer, fully-connected layer, and activation layer, e.g., ReLU layer.

The application block 102 may utilize at least part of the generated feature maps to acquire an application-specific output. For example, if the application block 102 performs a function of image segmentation, the application block 102 determines a type, e.g., person, car, foreground or background, for each pixel in the input image and cluster pixels with the same type to generate a label image. Or, if the application block 102 performs a function of object detection, information on the type, location, and size of object(s) in the input image may be outputted.

Moreover, the application loss block 103 may compare between the application-specific output obtained from the application block 102 and its corresponding Ground Truth (GT) to compute a loss. Then, the device 100 may obtain optimal parameters by using the computed loss during a first backpropagation process. Thereafter, the device 100 may remove the application loss block 103 for a real test.

FIG. 2A is a diagram illustrating an amount of computations varied according to a size of an input image whereas FIG. 2B is a diagram showing an accuracy of a result of an application, e.g., object detection, varied according to the size of the input image.

As shown in FIGS. 2A and 2B, the amount of computations of the CNN adapted for the device is proportional to the size of the input image. This is also the case for the object detection accuracy.

If the number of pixels in the input image is reduced, the amount of computations is reduced as well. However, as shown in FIG. 2B, the detection accuracy may be sacrificed due to the reduced size of the input image.

FIG. 3 is a block diagram schematically illustrating a process of generating feature maps by using a conventional CNN with a configuration including the FPN blocks according to prior art.

Referring to FIG. 3, the feature computation block 101 may include a plurality of convolution blocks, i.e., a (1-1)-th to a (1-k)-th filter blocks, for performing convolution operations. As shown in FIG. 3, each of the convolution blocks is comprised of multiple layers. In detail, each of the (1-1)-th to the (1-k)-th filter blocks includes alternately an arbitrary number of a convolutional layer and an activation layer, e.g., Rectified Linear Unit (ReLU). Such an iterative configuration repeatedly performs the convolution operations along with non-linear operations.

The (1-1)-th filter block generates a (1-1)-th feature map from the input image, and the (1-2)-th filter block generates a (1-2)-th feature map from the (1-1)-th feature map, and so on. Each of the filter blocks sequentially generates each of corresponding feature maps.

Due to the fact that number of channels of the input image is increased while the size thereof is decreased by each of the (1-1)-th to the (1-k)-th filter blocks, if the input image with a size and a channel of W×H×3 is carried to the (1-1)-th filter block, the (1-1)-th feature map with a size and a channel of W/2×H/2×C and the (1-2)-th feature map with a size and a channel of W/4×H/4×2C may be generated, and so on. Herein, each first factor, e.g., W, W/2, W/4, stands for a width of the input image, each second factor, e.g., H, H/2, H/4, represents a height thereof and each third factor, e.g., 3, C, 2C, stands for the number of channels thereof. Hence, the convolution blocks, i.e., the (1-1)-th to the (1-k)-th filter blocks, may generate the feature maps with various sizes and number of channels, respectively.

Referring to FIG. 3 again, a plurality of FPN blocks, i.e., a 1-st to a (k-1)-th FPN blocks, are respectively connected to each of the corresponding (1-1)-th to (1-k)-th filter blocks. Each of the FPN blocks includes a 1×1 convolution filter used for adjusting the number of channels of the feature map received from its corresponding filter block, an up-sampling block used for increasing the size of the feature map received from a previous FPN block, and a computation unit used for summing up an output of the 1×1 convolution filter and an output of the up-sampling block and then allowing the summed output to be provided to a next FPN block. Herein, the up-sampling block may double the size of the feature map received from the previous FPN block so that the size of the feature map received from the previous FPN block can be commensurate with that of the feature map received from the corresponding filter block.

As shown in FIG. 3, the 4-th FPN block receives the (1-4)-th feature map with a size and a channel of W/16×H/16×8C from the (1-4)-th filter block and adjusts the number of channels of the (1-4)-th feature map from 8C to D without modifying the size thereof. Also, the 4-th FPN block receives the (P-5)-th feature map with a size and a channel of W/32×H/32×D from the 5-th FPN block and rescales the size of the (P-5) feature map to W/16×H/16. Then, the (P-4)-th feature map with a size and a channel of W/16×H/16×D is generated and carried to the 3-rd FPN block, and so on. Each of the rest of the FPN blocks follows the same procedure described above to ultimately output the (P-1)-th feature map with a size and a channel of W/2×H/2×D. However, massive amount of computations is required for the feature computation block 101 including the FPN blocks.

Accordingly, the applicant of the present invention intends to disclose a novel method for generating feature maps with a high degree of accuracy of a result of an application while reducing computation time.

SUMMARY OF THE INVENTION

It is an object of the present invention to provide a method for generating feature maps by using a device adopting a CNN with reduced computation time.

It is another object of the present invention to provide a method for generating feature maps with a high degree of accuracy while reducing computation time.

In accordance with one aspect of the present invention, there is provided a learning method for improving performance of a CNN by using feature up-sampling networks (FUN) included in a learning device, wherein the learning device includes (i) a down-sampling block for reducing a size of an input image; (ii) each of a (1-1)-th to a (1-k)-th filter blocks from which each of a (1-1)-th to a (1-k)-th feature maps is acquired by performing one or more convolution operations; (iii) a (2-k)-th to a (2-1)-th up-sampling blocks each of which correspondingly interacts with each of the (1-1)-th to the (1-k)-th filter blocks and thereby generates each of a (2-k)-th to a (2-1)-th feature maps; (iv) an application block for generating an application-specific output by using at least part of the (2-k)-th to the (2-1)-th feature maps; and (v) an application-specific loss block for computing a loss by comparing between the application-specific output generated by the application block and Ground Truth (GT), comprising steps of: (a) the learning device, if the input image is obtained, allowing the down-sampling block to acquire a down-sampling image by applying a predetermined operation to the input image for reducing the size thereof; (b) the learning device, if the down-sampling image is obtained, allowing each of the (1-1)-th to the (1-k)-th filter blocks to respectively acquire each of the (1-1)-th to the (1-k)-th feature maps by applying the one or more convolution operations to the down-sampling image; (c) the learning device (I) allowing the (2-1)-th up-sampling block to (i) receive the down-sampling image from the down-sampling block, and (ii) receive the (2-2)-th feature map from the (2-2)-th up-sampling block, and then rescale a size of the (2-2)-th feature map to be identical to that of the down-sampling image and (iii) apply a certain operation to the down-sampling image and the (2-2)-th rescaled feature map, thereby acquiring the (2-1)-th feature map and (II) allowing the (2-(M+1))-th up-sampling block to (i) receive the (1-M)-th feature map from the (1-M)-th filter block, and (ii) receive the (2-(M+2))-th feature map from the (2-(M+2))-th up-sampling block, and then rescale a size of the (2-(M+2))-th feature map to be identical to that of the (1-M)-th feature map and (iii) apply a certain operation to the (1-M)-th feature map and the (2-(M+2))-th rescaled feature map in order to generate the (2-(M+1))-th feature map, thereby acquiring the (2-k)-th to the (2-2)-th feature maps, wherein M is an integer greater than or equal to 1; and (d) the learning device (i) allowing the application block to acquire the application-specific output by applying an application-specific operation to at least part of the (2-k)-th to the (2-1)-th feature maps and (ii) allowing the application-specific loss block to acquire the loss by comparing the application-specific output to the GT; and thereby adjusting parameters of at least part of the application block, the (2-k)-th to the (2-1)-th up-sampling blocks and the (1-1)-th to the (1-k)-th filter blocks by using the loss during a first backpropagation process.

In accordance with another aspect of the present invention, there is provided a testing method for applying operations to a test image as an input image by using a CNN with Feature Up-sampling Networks (FUN) included in a testing device to acquire an application-specific output, comprising steps of: (a) the testing device acquiring the test image on the conditions that by using a learning device which includes (i) a down-sampling block for reducing a size of a training image; (ii) each of a (1-1)-th to a (1-k)-th filter blocks from which each of a (1-1)-th to a (1-k)-th feature maps is acquired by performing one or more convolution operations thereon; (iii) a (2-k)-th to a (2-1)-th up-sampling blocks each of which correspondingly interacts with each of the (1-1)-th to the (1-k)-th filter blocks; (iv) an application block for generating the application-specific output by using at least part of the (2-k)-th to the (2-1)-th feature maps; and (v) an application-specific loss block for computing a loss by comparing between the application-specific output generated by the application block and Ground Truth (GT), processes of (1) allowing the down-sampling block to acquire a down-sampling image for training by applying a predetermined operation to the training image for reducing the size thereof if the training image is obtained; (2) allowing each of the (1-1)-th to the (1-k)-th filter blocks to respectively acquire each of the (1-1)-th to the (1-k)-th feature maps for training by applying the one or more convolution operations to the down-sampling image for training if the down-sampling image for training is obtained; (3)(I) allowing the (2-1)-th up-sampling block to (i) receive the down-sampling image from the down-sampling block, (ii) receive the (2-2)-th feature map from the (2-2)-th up-sampling block, and then rescale a size of the (2-2)-th feature map to be identical to that of the down-sampling image, and (iii) apply a certain operation to the down-sampling image and the (2-2)-th rescaled feature map, thereby acquiring the (2-1)-th feature map, and (II) allowing the (2-(M+1))-th up-sampling block to (i) receive the (1-M)-th feature map from the (1-M)-th filter block, (ii) receive the (2-(M+2))-th feature map from the (2-(M+2))-th up-sampling block, and then rescale a size of the (2-(M+2))-th feature map to be identical to that of the (1-M)-th feature map, and (iii) apply a certain operation to the (1-M)-th feature map and the (2-(M+2))-th rescaled feature map in order to generate the (2-(M+1))-th feature map, thereby acquiring the (2-k)-th to the (2-2)-th feature maps, wherein M is an integer greater than or equal to one; and (4)(i) allowing the application block to acquire the application-specific output by applying an application-specific operation to at least part of the (2-k)-th to the (2-1)-th feature maps for training, and (ii) allowing the application-specific loss block to acquire the loss by comparing the application-specific output to the GT; and thereby adjusting parameters of at least part of the application block, the (2-k)-th to the (2-1)-th up-sampling blocks and the (1-1)-th to the (1-k)-th filter blocks by using the loss during a backpropagation process have been executed; (b) the testing device, if the test image is obtained, allowing the down-sampling block to acquire a down-sampling image for testing by applying a predetermined operation to the test image for reducing the size thereof; (c) the testing device, if the down-sampling image for testing is obtained, allowing each of the (1-1)-th to the (1-k)-th filter blocks to respectively acquire each of the (1-1)-th to the (1-k)-th feature maps for testing by applying the one or more convolution operations to the down-sampling image for testing; (d) the testing device, (I) allowing the (2-1)-th up-sampling block to (i) receive the down-sampling image for testing from the down-sampling block, (ii) receive the (2-2)-th feature map for testing from the (2-2)-th up-sampling block, and then rescale a size of the (2-2)-th feature map for testing to be identical to that of the down-sampling image for testing, and (iii) apply a certain operation to the down-sampling image for testing and the (2-2)-th rescaled feature map for testing, thereby acquiring the (2-1)-th feature map for testing, and (II) allowing the (2-(M+1))-th up-sampling block to (i) receive the (1-M)-th feature map for testing from the (1-M)-th filter block, (ii) receive the (2-(M+2))-th feature map for testing from the (2-(M+2))-th up-sampling block, and then rescale a size of the (2-(M+2))-th feature map for testing to be identical to that of the (1-M)-th feature map for testing, and (iii) apply a certain operation to the (1-M)-th feature map for testing and the (2-(M+2))-th rescaled feature map for testing in order to generate the (2-(M+1))-th feature map for testing, thereby acquiring the (2-k)-th to the (2-2)-th feature maps for testing, wherein M is an integer greater than or equal to one; and (e) the testing device allowing the application block to acquire the application-specific output by applying an application-specific operation to at least part of the (2-k)-th to the (2-1)-th feature maps for testing.

In accordance with still another aspect of the present invention, there is provided a learning device for improving performance of a CNN by using Feature Up-sampling Networks (FUN), wherein the learning device includes (i) a down-sampling block for reducing a size of a training image as an input image; (ii) each of a (1-1)-th to a (1-k)-th filter blocks from which each of a (1-1)-th to a (1-k)-th feature maps is acquired by performing one or more convolution operations; (iii) a (2-k)-th to a (2-1)-th up-sampling blocks each of which correspondingly interacts with each of the (1-1)-th to the (1-k)-th filter blocks and thereby generates each of a (2-k)-th to a (2-1)-th feature maps; (iv) an application block for generating an application-specific output by using at least part of the (2-k)-th to the (2-1)-th feature maps; and (v) an application-specific loss block for computing a loss by comparing between the application-specific output generated by the application block and Ground Truth (GT), comprising: a communication part for receiving the training image; and a processor for performing processes of (1) allowing, if the input image is obtained, the down-sampling block to acquire a down-sampling image by applying a predetermined operation to the input image for reducing the size thereof; (2) allowing, if the down-sampling image is obtained, each of the (1-1)-th to the (1-k)-th filter blocks to respectively acquire each of the (1-1)-th to the (1-k)-th feature maps by applying the one or more convolution operations to the down-sampling image; (3)(I) allowing the (2-1)-th up-sampling block to (i) receive the down-sampling image from the down-sampling block, (ii) receive the (2-2)-th feature map from the (2-2)-th up-sampling block, and then rescale the size of the (2-2)-th feature map to be identical to that of the down-sampling image, and (iii) apply a certain operation to the down-sampling image and the (2-2)-th rescaled feature map, thereby acquiring the (2-1)-th feature map, and (II) allowing the (2-(M+1))-th up-sampling block to (i) receive the (1-M)-th feature map from the (1-M)-th filter block, (ii) receive the (2-(M+2))-th feature map from the (2-(M+2))-th up-sampling block, and then rescale a size of the (2-(M+2))-th feature map to be identical to that of the (1-M)-th feature map, and (iii) apply a certain operation to the (1-M)-th feature map and the (2-(M+2))-th rescaled feature map in order to generate the (2-(M+1))-th feature map, thereby acquiring the (2-k)-th to the (2-2)-th feature maps, wherein M is an integer greater than or equal to one; and (4)(i) allowing the application block to acquire the application-specific output by applying an application-specific operation to at least part of the (2-k)-th to the (2-1)-th feature maps and (ii) allowing the application-specific loss block to acquire the loss by comparing the application-specific output to the GT; and thereby adjusting parameters of at least part of the application block, the (2-k)-th to the (2-1)-th up-sampling blocks and the (1-1)-th to the (1-k)-th filter blocks by using the loss during a first backpropagation process.

In accordance with still yet another aspect of the present invention, there is provided a testing device for applying operations to a test image as an input image by using a CNN with Feature Up-sampling Networks (FUN) to acquire an application-specific output, comprising: a communication part for receiving the test image, on the conditions that by using a learning device which includes (i) a down-sampling block for reducing a size of a training image; (ii) each of a (1-1)-th to a (1-k)-th filter blocks from which each of a (1-1)-th to a (1-k)-th feature maps is acquired by performing one or more convolution operations thereon; (iii) a (2-k)-th to a (2-1)-th up-sampling blocks each of which correspondingly interacts with each of the (1-1)-th to the (1-k)-th filter blocks; (iv) an application block for generating the application-specific output by using at least part of the (2-k)-th to the (2-1)-th feature maps; and (v) an application-specific loss block for computing a loss by comparing between the application-specific output generated by the application block and Ground Truth (GT), processes of (1) allowing the down-sampling block to acquire a down-sampling image for training by applying a predetermined operation to the training image for reducing the size thereof if the training image is obtained; (2) allowing each of the (1-1)-th to the (1-k)-th filter blocks to respectively acquire each of the (1-1)-th to the (1-k)-th feature maps for training by applying the one or more convolution operations to the down-sampling image for training if the down-sampling image for training is obtained; (3)(I) allowing the (2-1)-th up-sampling block to (i) receive the down-sampling image from the down-sampling block, (ii) receive the (2-2)-th feature map from the (2-2)-th up-sampling block, and then rescale a size of the (2-2)-th feature map to be identical to that of the down-sampling image, and (iii) apply a certain operation to the down-sampling image and the rescaled (2-2)-th feature map, thereby acquiring the (2-1)-th feature map, and (II) allowing the (2-(M+1))-th up-sampling block to (i) receive the (1-M)-th feature map from the (1-M)-th filter block, (ii) receive the (2-(M+2))-th feature map from the (2-(M+2))-th up-sampling block, and then rescale a size of the (2-(M+2))-th feature map to be identical to that of the (1-M)-th feature map, and (iii) apply a certain operation to the (1-M)-th feature map and the (2-(M+2))-th rescaled feature map in order to generate the (2-(M+1))-th feature map, thereby acquiring the (2-k)-th to the (2-2)-th feature maps, wherein M is an integer greater than or equal to one; and (4)(i) allowing the application block to acquire the application-specific output by applying an application-specific operation to at least part of the (2-k)-th to the (2-1)-th feature maps for training, and (ii) allowing the application-specific loss block to acquire the loss by comparing the application-specific output to the GT; and thereby adjusting parameters of at least part of the application block, the (2-k)-th to the (2-1)-th up-sampling blocks and the (1-1)-th to the (1-k)-th filter blocks by using the loss during a backpropagation process have been executed; and a processor for performing processes of: (1) allowing the down-sampling block to acquire a down-sampling image for testing by applying a predetermined operation to the test image for reducing the size thereof if the test image is obtained; (2) allowing each of the (1-1)-th to the (1-k)-th filter blocks to respectively acquire each of the (1-1)-th to the (1-k)-th feature maps for testing by applying the one or more convolution operations to the down-sampling image for testing if the down-sampling image for testing is obtained; (3)(I) allowing the (2-1)-th up-sampling block to (i) receive the down-sampling image for testing from the down-sampling block, (ii) receive the (2-2)-th feature map for testing from the (2-2)-th up-sampling block; and then rescale a size of the (2-2)-th feature map for testing to be identical to that of the down-sampling image for testing, and (iii) apply a certain operation to the down-sampling image for testing and the (2-2)-th rescaled feature map for testing, thereby acquiring the (2-1)-th feature map for testing, and (II) allowing the (2-(M+1))-th up-sampling block to (i) receive the (1-M)-th feature map for testing from the (1-M)-th filter block, (ii) receive the (2-(M+2))-th feature map for testing from the (2-(M+2))-th up-sampling block, and then rescale a size of the (2-(M+2))-th feature map for testing to be identical to that of the (1-M)-th feature map for testing, and (iii) apply a certain operation to the (1-M)-th feature map for testing and the (2-(M+2))-th rescaled feature map for testing in order to generate the (2-(M+1))-th feature map for testing, thereby acquiring the (2-k)-th to the (2-2)-th feature maps for testing, wherein M is an integer greater than or equal to one; and (4) allowing the application block to acquire the application-specific output by applying an application-specific operation to at least part of the (2-k)-th to the (2-1)-th feature maps for testing.

BRIEF DESCRIPTION OF THE DRAWINGS

The above and other objects and features of the present invention will become conspicuous from the following description of preferred embodiments given in conjunction with the accompanying drawings, in which.

DETAILED DESCRIPTION OF THE PREFERRED EMBODIMENTS

Figure 1:
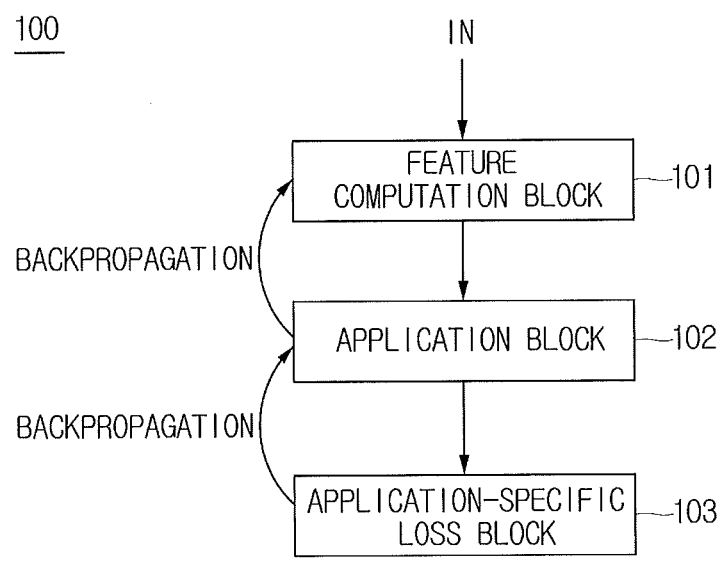
FIG. 1 is a block diagram of a device adopting a CNN according to prior art.
Figure 2A:
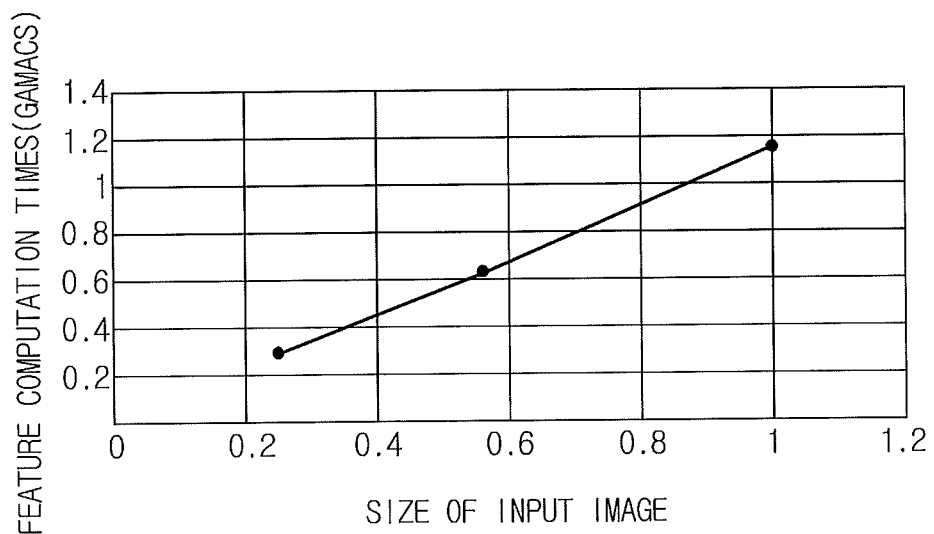
FIG. 2A is a diagram illustrating an amount of computations varied according to a size of an input image.
Figure 2B:
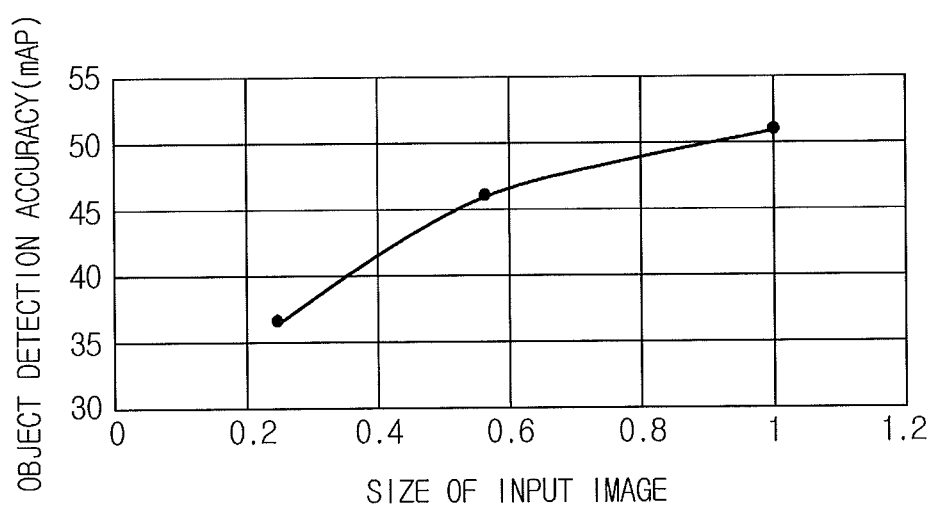
FIG. 2B is a diagram showing an accuracy of a result of an application, e.g., object detection, varied according to the size of the input image.

To make purposes, technical solutions, and advantages of the present invention clear, reference is made to the accompanying drawings that show, by way of illustration, more detailed example embodiments in which the invention may be practiced. These preferred embodiments are described in sufficient detail to enable those skilled in the art to practice the invention.

It is to be appreciated that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be appreciated that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Hereinafter, preferred embodiments of the present invention will be described in detail with reference to the accompanying drawings so that those skilled in the art may easily implement the present invention.

Figure 4:
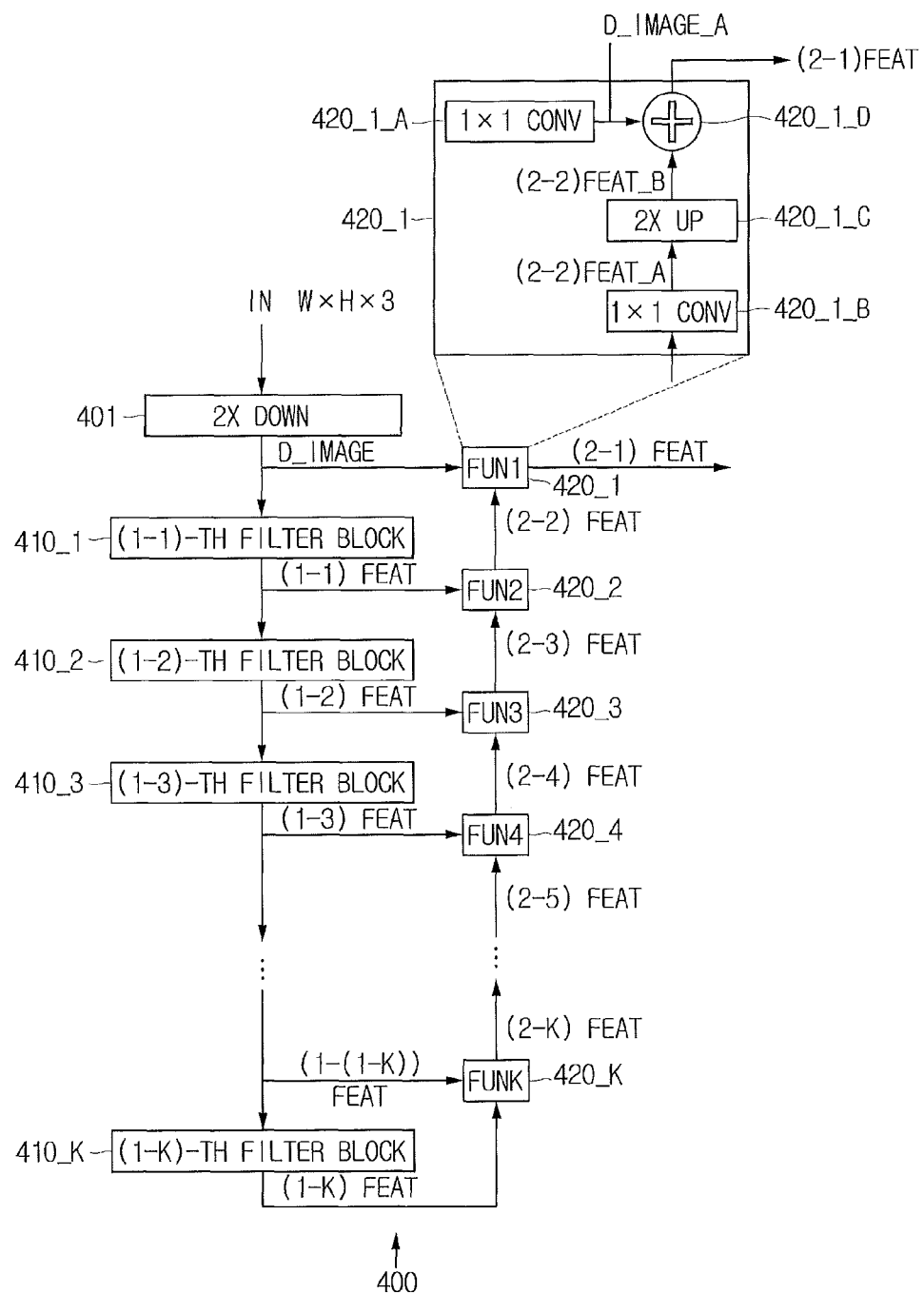
FIG. 4 is a block diagram illustrating a process of generating feature maps by using a CNN with a configuration including Feature Up-sampling Networks (FUN) blocks in accordance with one example embodiment of the present invention.

FIG. 4 is a block diagram illustrating a process of generating feature maps by using a CNN with a configuration including Feature Up-sampling Networks (FUN) blocks in accordance with one example embodiment of the present invention.

Figure 3:
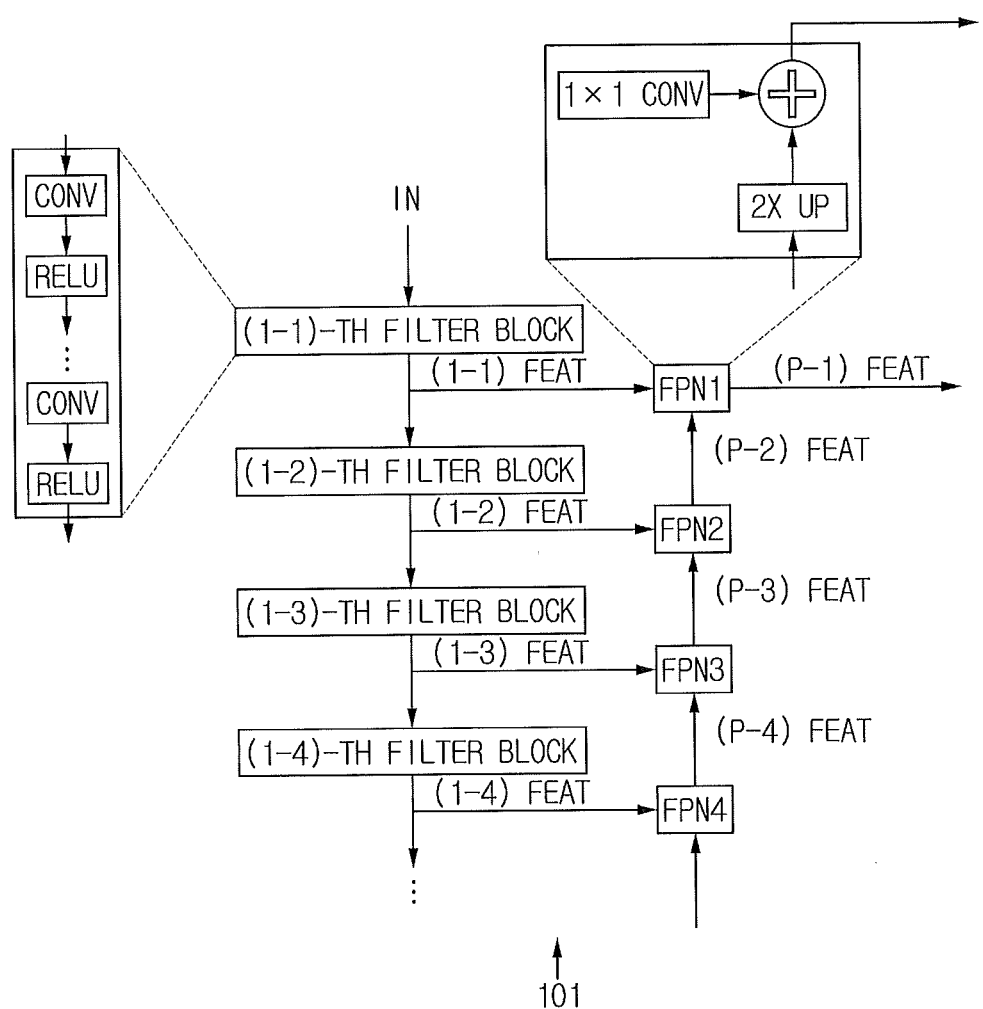
FIG. 3 is a block diagram schematically illustrating a process of generating feature maps by using a conventional CNN with a configuration including Feature Pyramid Networks (FPN) blocks according to prior art.

Unlike a conventional CNN with a configuration including Feature Pyramid Networks (FPN) blocks depicted in FIG. 3, a Feature Computation Block 400 with a configuration including Feature Up-Sampling Networks (FUN) blocks may include a down-sampling block 401 to reduce a size of an input image before the input image is fed into a plurality of filter blocks, i.e., convolution filters.

The down-sampling block 401 may perform a process of reducing the size of the input image to thereby generate a downsized image, i.e., a down-sampling image. If a size and a channel of the input image is W×H×3, a size and a cannel of the down-sampling image, i.e., D_IMAGE, may be W/2×H/2×3. As an example, the down-sampling block 401 may reduce the size of the input image by a ratio of 1/2, but it is not limited thereto.

Meanwhile, the Feature Computation Block 400 may include a plurality of convolution blocks, i.e., the (1-1)-th filter block 410_1, the (1-2)-th filter block 410_2, the (1-3)-th filter block 410_3, . . . , and the (1-k)-th filter block 410_k, which are layered one after another.

In detail, each of the (1-1)-th to the (1-k)-th filter blocks is iteratively and alternately comprised of an arbitrary number of a convolutional layer and an activation layer, e.g., Rectified Linear Unit (ReLU). Such a configuration may iteratively and alternately perform convolution operations along with non-linear operations.

Referring to FIG. 4, the (1-1)-th filter block 410_1 may generate the (1-1)-th feature map, i.e., (1-1)FEAT in FIG. 4, by applying a convolution operation to the input image and the (1-2)-th filter block 410_2 may generate the (1-2)-th feature map, i.e., (1-2)FEAT, by applying a convolution operation to the (1-1)-th feature map and so on. Such a procedure described above continues to the last filter block, i.e., the (1-k)-th filter block 410_k, and produces an ultimate feature map outputted from the convolution blocks and indicated as (1-k)FEAT in FIG. 4.

In detail, the (1-1)-th filter block 410_1 receives the down-sampling image with a size and a channel of W/2×H/2×3 and outputs the (1-1)-th feature map with a size and a channel of W/4×H/4×C. The (1-2)-th filter block 410_2 receives the (1-1)-th feature map with the size and the channel of W/4×H/4×C and outputs the (1-2)-th feature map with a size and a channel of W/8×H/8×2C. Such a procedure continues with each of the rest of filter blocks so as to generate the ultimate feature map with the minimum size and the maximum number of channels among all the feature maps.

Compared to the feature computation block 101 shown in FIG. 3, the feature computation block 400 illustrated in FIG. 4 may perform operations on the feature maps with reduced sizes and thus, an amount of computations executed by the feature computation Block 400 may be decremented. That is, since each of the filter blocks, i.e., the (1-1)-th to the (1-k)-th filter blocks may apply convolution operations to half-sized feature maps compared to those shown in FIG. 3, the amount of computations required for the overall convolution blocks is reduced and a performance of the overall convolution blocks is improved.

Referring to FIG. 4 again, the feature computation block 400 may rescale the sizes of the respective feature maps via the FUN blocks, hereinafter referred to as up-sampling blocks.

Specifically, each of the 1-st FUN block 420_1, i.e., the (2-1)-th up-sampling block, to the k-th FUN block 420_k, i.e., the (2-k)-th up-sampling block, individually and correspondingly interacts with its corresponding filter blocks, and performs operations in a direction from the k-th FUN block 420_k to the 1-st FUN block 420_1.

Moreover, each of the up-sampling blocks, i.e., the (2-1)-th up-sampling block 420_1 to the (2-k)-th up-sampling block 420_k, may include a first filter 420_1_A, e.g., 1×1 convolution filter, for adjusting the number of channels of a first feature map, a second filter 420_1_B, e.g., 1×1 convolution filter, for adjusting the number of channels of a second feature map, and a scaling-up block 420_1_C for applying an up-sampling operation to output of the second filter to thereby enlarge the size of the output. Each of the up-sampling blocks may further include an aggregation block 420_1_D for applying a certain operation, e.g., a summing-up operation, to outputs of both the first filter 420_1_A and the scaling-up block 420_1_C.

In detail, the first filter 420_1_A in the (2-1)-th up-sampling block 420_1 may apply a convolution operation to the down-sampling image D_IMAGE to acquire an adjusted feature map D_IMAGE_A whose number of channels is modified. The second filter 420_1_B in the (2-1)-th up-sampling block 420_1 may apply a convolution operation to the (2-2)-th feature map (2-2)FEAT which is relayed from the (2-2)-th up-sampling block 420_2 in order to acquire a (2-2)-th adjusted feature map (2-2)FEAT_A. And the scaling-up block 420_1_C in the (2-1)-th up-sampling block 420_1 may apply the up-sampling operation to the (2-2)-th adjusted feature map (2-2)FEAT_A for scaling up the size of the (2-2)-th adjusted feature map to thereby acquire a (2-2)-th rescaled feature map (2-2)FEAT_B. Further, the aggregation block 420_1_D in the (2-1)-th up-sampling block 420_1 may apply a certain operation, e.g., a summing-up operation, to both the adjusted feature map D_IAMGE_A of the down-sampling image and the (2-2)-th rescaled feature map (2-2)FEAT_B for the generation of the (2-1)-th feature map (2-1)FEAT.

For a reference, the scaling-up block 420_1_C in the (2-1)-th up-sampling block may determine an up-sampling ratio for the (2-2)-th adjusted feature map (2-2)FEAT_A by referring to a down-sampling ratio of the down-sampling block 401. Then, the (2-2)-th rescaled feature map (2-2) FEAT_B is generated according to the determined up-sampling ratio.

Furthermore, in case M is an integer greater than or equal to 1 and less than or equal to k-2, the first filter 420_(M+1)_A in the (2-(M+1))-th up-sampling block 420_(M+1) may apply a convolution operation to the (1-M)-th feature map (1-M)FEAT which is received from the (1-M)-th filter block to obtain the (1-M)-th adjusted feature map (1-M) FEAT_A whose number of channels is adjusted by the first filter 420_(M+1)_A. The second filter 420_(M+1)_B in the (2-(M+1))-th up-sampling block 420_(M+1) may apply a convolution operation to the (2-(M+2))-th feature map (2-(M+2))FEAT which is received from the (2-(M+2))-th up-sampling block 420_(M+2) to obtain the (2-(M+2))-th adjusted feature map (2-(M+2))FEAT_A. And then, the scaling-up block 420_(M+1)_C within the (2-(M+1))-th up-sampling block 420_(M+1) may rescale the size of the (2-(M+2))-th adjusted feature map (2-(M+2))FEAT_A to be identical to that of the (1-M)-th adjusted feature map (1-M)

FEAT_A and thus acquiring the (2-(M+2))-th rescaled feature map (2-(M+2))FEAT_B. Then, the aggregation block 420_(M+1)_D within the (2-(M+1))-th up-sampling block apply the certain operation, e.g., the summing-up operation, to the (1-M)-th adjusted feature map (1-M)FEAT_A and the (2-(M+2))-th rescaled feature map (2-(M+2))FEAT_B in order to generate the (2-(M+1))-th feature map (2-(M+1))FEAT, thereby acquiring each of the (2-k)-th to the (2-2)-th feature maps.

As one of the boundary conditions described above, the (2-1)-th up-sampling block 420_1 may receive the down-sampling image D_IMAGE from the down-sampling block 401, and receive the (2-2)-th feature map (2-2)FEAT from the (2-2)-th up-sampling block 420_2, and then rescale the size of the (2-2)-th adjusted feature map (2-2)FEAT_A to be identical to that of the adjusted feature map of the down-sampling image D_IAMGE_A, and thereafter apply the certain operation to both feature maps, i.e., (2-2)FEAT_A and D_IAMGE_A, to thereby outputting the (2-1)-th feature map (2-1)FEAT.

As the other boundary condition, the first filter 420_k_A in the (2-k)-th up-sampling block 420_k may apply the convolution operation to the (1-(k-1))-th feature map (1-(k-1))FEAT to acquire the (1-(k-1))-th adjusted feature map (1-(k-1))FEAT_A whose number of channels is adjusted by the first filter 420_k_A. The second filter 420_k_B within the (2-k)-th up-sampling block 420_k may apply the convolution operation to the (1-k)-th feature map (1-k)FEAT which is relayed from the (1-k)-th filter block 410_k in order to acquire the (1-k)-th adjusted feature map (1-k)FEAT_A. And the scaling-up block 420_k_C in the (2-k)-th up-sampling block 420_k may apply the up-sampling operation to the (1-k)-th adjusted feature map (1-k)FEAT_A for scaling up the size of the (1-k)-th adjusted feature map in order to acquire a (1-k)-th rescaled feature map (1-k)FEAT_B. Further, the aggregation block 420_1_D in the (2-k)-th up-sampling block 420_k may apply the certain operation to both the (1-(k-1))-th adjusted feature map (1-(k-1))FEAT_A and the (1-k)-th rescaled feature map (1-k)FEAT_B for the generation of the (2-k)-th feature map (2-k)FEAT.

However, in case that the number of channels of the (1-k)-th feature map (1-k)FEAT is as twice as that of the (1-(k-1))-th feature map (1-(k-1))FEAT, the operation of the second filter 420_k_B within the (2-k)-th up-sampling block 420_k may be skipped. In this case, the (2-k)-th up-sampling block 420_k may not include the second filter 420_k_B for adjusting the number of channels of the (1-k)-th feature map (1-k)FEAT, and the scaling-up block 420_k_C within the (2-k)-th up-sampling block 420_k may directly apply the up-sampling operation to the (1-k)-th feature map (1-k)FEAT thereby obtaining the (1-k)-th rescaled feature map (1-k)FEAT_B. Furthermore, the aggregation block 420_k_D within the (2-k)-th up-sampling block 420_k may apply the certain operation, e.g., the summing-up operation, to both the (1-(k-1))-th adjusted feature map (1-(k-1))FEAT_A and the (1-k)-th rescaled feature map (1-k)FEAT_B for the generation of the (2-k)-th feature map (2-k)FEAT.

Figure 5:
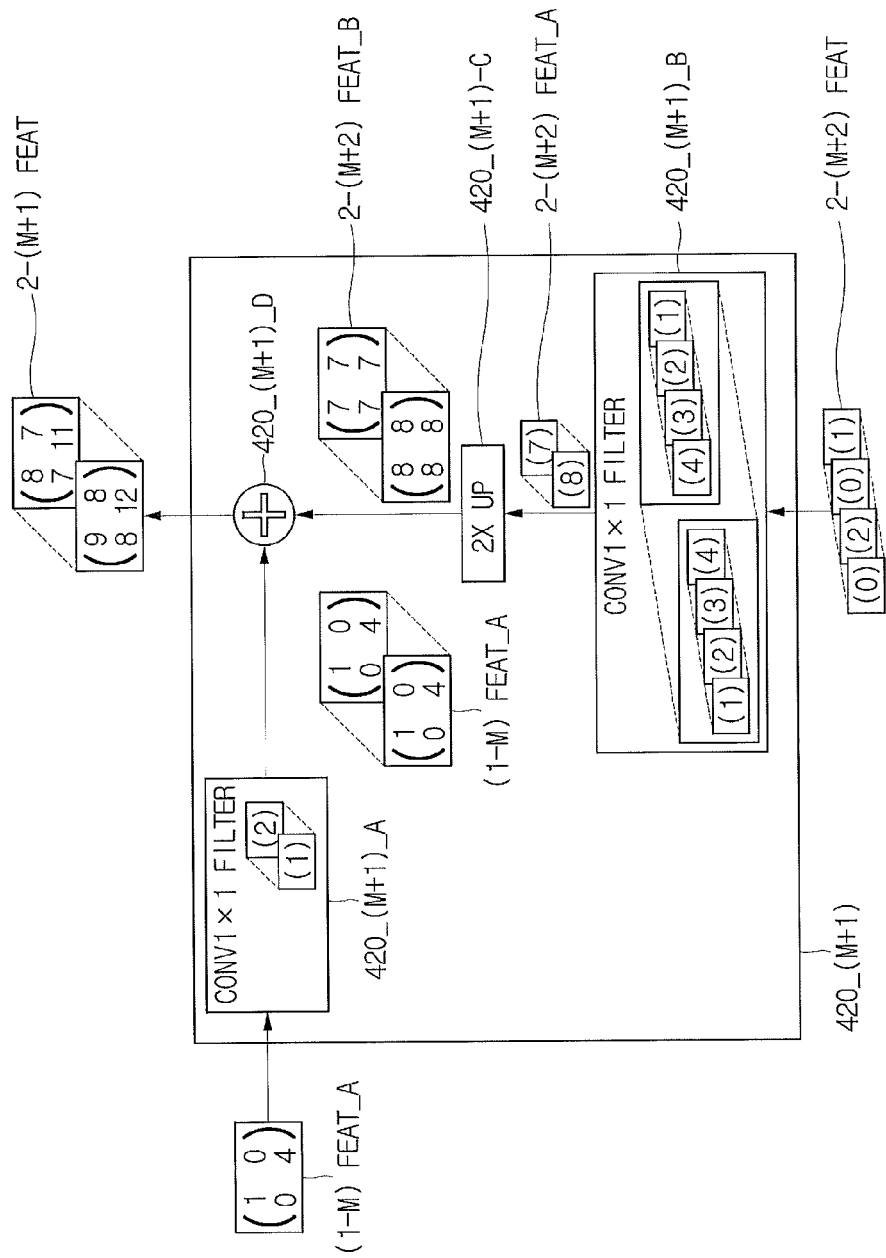
FIG. 5 is a drawing showing an up-sampling block and its computations in accordance with one example embodiment of the present invention.

FIG. 5 is a drawing showing an up-sampling block and its computations in accordance with one example embodiment of the present invention. Referring to FIG. 5, if the (1-M)-th feature map (1-M)FEAT passes through the first filter 420_(M+1)_A of the (2-(M+1))-th up-sampling block 420_(M+1), as an example, the (1-M)-th adjusted feature map (1-M)FEAT_A is generated by doubling the number of channels of the (1-M)-th feature map (1-M)FEAT while maintaining its size as same as that of the (1-M)-th feature map.

Moreover, if the (2-(M+2))-th feature map (2-(M+2))FEAT passes through the second filter 420_(M+1)_B of the (2-(M+1))-th up-sampling block 420_(M+1), as an example, the (2-(M+2))-th adjusted feature map (2-(M+2))FEAT_A is generated by reducing the number of channels of the (2-(M+2))-th feature map (2-(M+2))FEAT to a half while retaining the size of the (2-(M+2))-th adjusted feature map as same as that of the (2-(M+2))-th feature map (2-(M+2))FEAT.

Further, in case the (2-(M+2))-th adjusted feature map (2-(M+2))FEAT_A passes through the scaling-up block 420_(M+1)_C of the (2-(M+1))-th up-sampling block 420_(M+1), as an example, the (2-(M+2))-th rescaled feature map (2-(M+2)) FEAT_B is generated by doubling the size of the (2-(M+2))-th adjusted feature map (2-(M+2))FEAT_A while retaining its number of channels as same as that of the (2-(M+2))-th adjusted feature map (2-(M+2))FEAT_A.

Furthermore, due to the fact that both the (1-M)-th adjusted feature map (1-M)FEAT_A and the (2-(M+2))-th rescaled feature map (2-(M+2))FEAT_B have the same number of channels and the same size, the aggregation block 420_(M+1)_D of the (2-(M+1))-th up-sampling block 420_(M+1) can apply the certain operation, e.g., the summing-up operation, to both feature maps. The result of the operation performed by the aggregation block 420_(M+1)_D is the (2-(M+1))-th feature map (2-(M+1))FEAT.

That is, the convolution operations performed by both the first filter 420_(M+1)_A and the second filter 420_(M+1)_B of the (2-(M+1))-th up-sampling block is to adjust the number of channels of the (1-M)-th feature map (1-M)FEAT and the 2-(M+2)-th feature map (2-(M+2))FEAT to be identical to each other. For example, the first filter 420_(M+1)_A in the (2-(M+1))-th up-sampling block 420_(M+1) illustrated in FIG. 5 doubles the number of channels of the (1-M)-th feature map (1-M)FEAT and the second filter 420_(M+1)_B in the (2-(M+1))-th up-sampling block 420_(M+1) shown in FIG. 5 reduces the number of channels of the (1-M)-th feature map (1-M)FEAT by a ratio of 1/2, thus making the number of channels to be equal to each other.

Besides, the scaling-up block 420_(M+1)_C in the (2-(M+1))-th up-sampling block 420_(M+1) is used for changing the size of the (2-(M+2))-th feature map (2-(M+2))FEAT_A to be the same as that of the (1-M)-th adjusted feature map (1-M)FEAT_A. As an example, the scaling-up block may double the size of the (2-(M+2))-th adjusted feature map (2-(M+2))FEAT_A to be the same as that of the (1-M)-th feature map (1-M)FEAT, but the ratio of increment is not limited thereto. The same procedure applies to both the (2-1)-th up-sampling block 420_1 receiving the down-sampling image D_IMAGE and the (2-k)-th up-sampling block 420_k receiving the (1-k)-th feature map (1-k)FEAT.

Referring to FIG. 4 again, as illustrated in FIG. 4, the (2-4)-th up-sampling block 420_4, i.e., FUN4, may receive the (1-3)-th feature map with a size and a channel of W/16×H/16×4C and may adjust the number of channels from 4C to 8C and retain the size as that of the (1-3)-th feature map, e.g., W/16×H/16. Also, the FUN4 may receive the (2-5)-th feature map (2-5)FEAT with a size and a channel of W/32×H/32×16C and may change the size and the number of channels thereof to be W/16×H/16×8C, and then may perform operations on both the (2-5)-th rescaled feature map and the (1-3)-th adjusted feature map to thereby generate and output the (2-4)-th feature map (2-4)FEAT with a size and a channel of W/16×H/16×8C. Likewise, the (2-3)-th up-sampling block 420_3, i.e., FUN3, and the (2-2)-th up-sampling block 420_2, i.e., FUN2, may follow the same procedure as mentioned above and thereby may generate the (2-2)-th feature map and may relay it to the (2-1)-th up-sampling block 420_1, i.e., FUN1. The FUN1 may receive the down-sampling image D_IMAGE with the size and the channel of W/2×H/2×3, and may adjust the number of channels of the down-sampling image from 3 to C and retain the size thereof, e.g., W/2×H/2.

In addition, the FUN1 may receive the (2-2)-th feature map (2-2)FEAT with the size and the channel of W/4×H/4×2C and may adjust the number of channels of it to be C and rescale the size thereof to be W/2×H/2. Then, the FUN1 may perform the certain operation, e.g., the summing-up operation, on the (2-2)-th resealed feature map and the adjusted feature map of the down-sampling image to generate the (2-1)-th feature map (2-1)FEAT with a size and a channel of W/2×H/2×C.

Meanwhile, a device adopting the conventional CNN with the configuration including the FPN blocks as illustrated in FIG. 3 allows the FPN blocks to retain the number of channels of each of the feature maps generated by the respective FPN blocks to be same as that of an ultimate feature map (not shown).

In contrast with the device mentioned above, the device adopting the CNN with the configuration including the FUN blocks as shown in FIG. 4 allows the FUN blocks to iteratively reduce the number of channels of each of the feature maps outputted by the individual FUN blocks to be half of that of each of their corresponding inputted feature maps. As for the size, each of the feature maps generated by the respective FPN blocks has the same dimension with each of the feature maps produced by the individual FUN blocks.

Accordingly, performance of the CNN, which is implemented in accordance with one example embodiment of the present invention, is improved as a result of reduced amount of computations of the CNN due to the decreased number of channels of the feature maps involved in the computations. Further, although the device adopting the CNN with the configuration including the FUN blocks may reduce the amount of computations performed by the CNN, the dimension of each of the feature maps generated through the FUN blocks is as equal as that of each of the feature maps outputted from the FPN blocks. Therefore, there is rarely a difference between the CNN with the configuration of the FUN blocks and the conventional CNN with the configuration of the FPN blocks regarding correctness of a result engendered by an application like object detection or other applications.

Figure 6A:
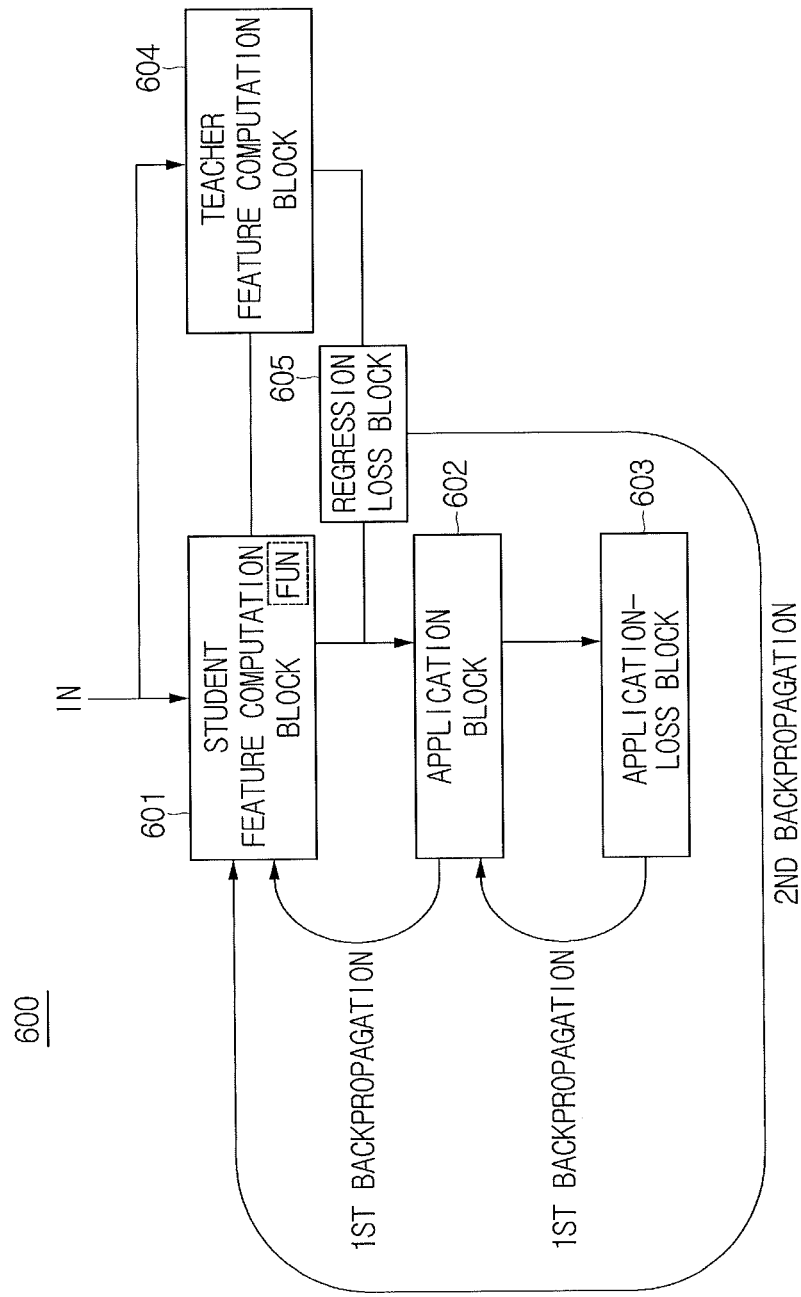
FIGS. 6a and 6b are block diagrams of a learning device adopting a CNN with a configuration including Feature Up-sampling Networks (FUN) blocks in accordance with one example embodiment of the present invention.
Figure 6B:
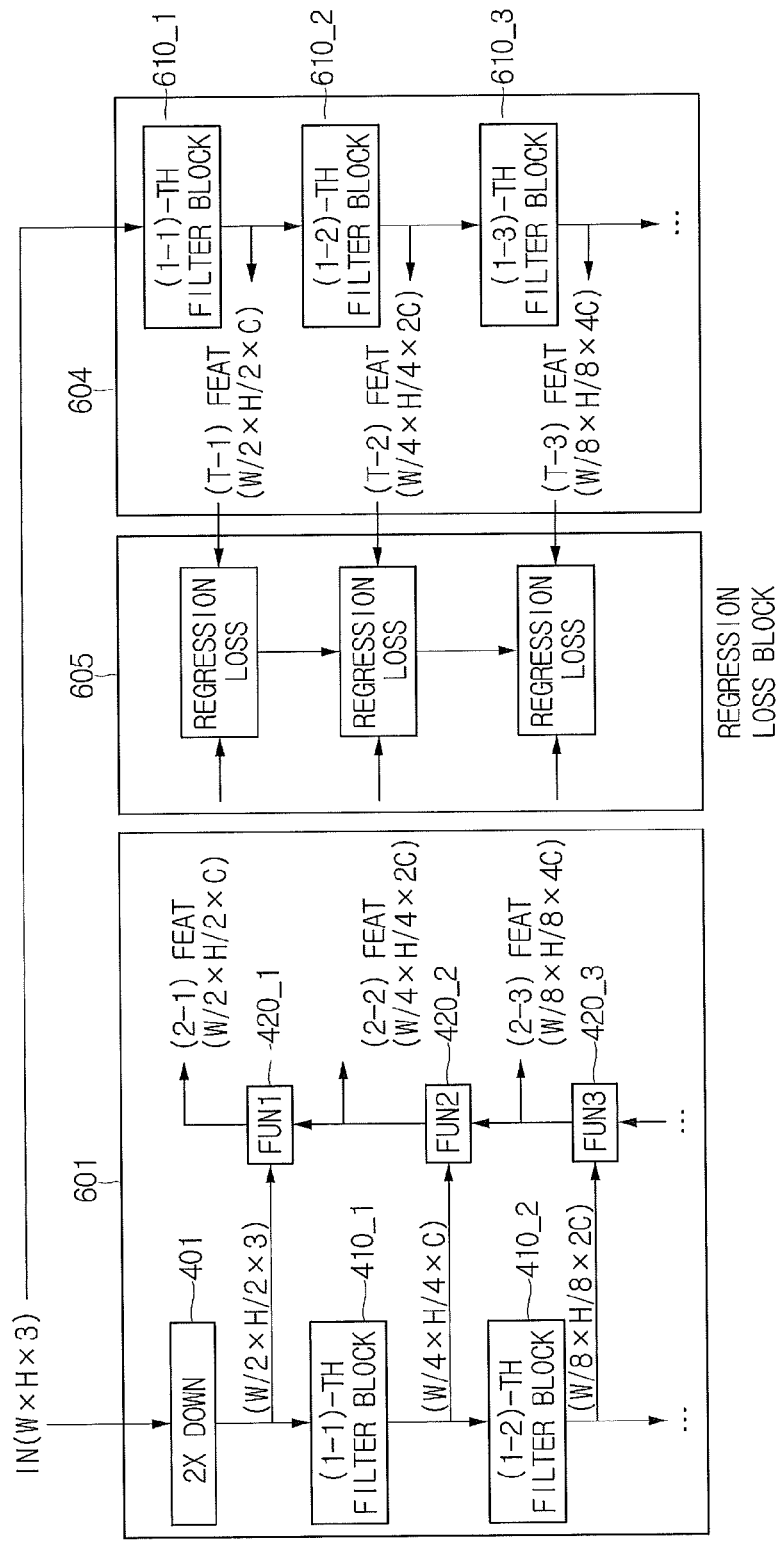

FIGS. 6A and 6B are block diagrams of a learning device adopting a CNN with a configuration including Feature Up-sampling Networks (FUN) blocks in accordance with one example embodiment of the present invention.

Referring to FIG. 6A, the device 600 may include a student feature computation block 601, an application block 602, an application loss block 603, a teacher feature computation block 604 and a regression loss block 605.

Herein, the student feature computation block 601 may have a configuration merely including the down-sampling block 401 and the FUN blocks, i.e., the (2-1)-th up-sampling block 420_1 to the (2-k)-th up-sampling block 420_k, to thereby reduce the required amount of computations. When the student feature computation block 601 receives an input image, a combination of the down-sampling block, the convolution blocks and the FUN blocks may generate feature maps based on the input image. The functions of the application block 602 and the application loss block 603 is similar to those illustrated in FIG. 1, e.g., the functions of the application block 102 and those of the application loss block 103, descriptions of the functions of the duplicated components may be omitted.

Moreover, the teacher feature computation block 604, or teacher encoding layers, may perform a process of respectively generating a (T-1)-th to a (T-k)-th feature maps whose respective sizes are corresponding to those of the respective (2-1)-th to the (2-k)-th feature maps and which are acquired by applying one or more convolution operations to the input image without passing through the down-sampling block. Herein, the student feature computation block 601 receives the same input image as the teacher feature computation block 604.

The regression loss block 605 may generate regression losses by comparing each of the (2-1)-th to the (2-k)-th feature maps generated by the student feature computation block 601 with each of the (T-1)-th to the (T-k)-th feature maps generated by the teacher feature computation block 604, and then may allow parameters of at least part of the (1-1)-th to the (1-k)-th filter blocks and the (2-1)-th to the (2-k)-th up-sampling blocks to be adjusted during a second backpropagation process by using the regression losses.

Specifically, the device 600 may perform a learning process of diminishing application-specific losses along with the regression losses during the first and second backpropagation processes. The application-specific losses are acquired via the application loss block 603 and the regression losses are obtained via the regression loss block 605. The learning process seeks to make the feature maps generated by the FUN blocks of the student feature computation block 601 be as similar as possible to the feature maps generated by the teacher feature computation block 604. Hence, the regression losses are lessened as well.

In other words, the first backpropagation process triggered by the application loss block 603 may adjust parameters of the student feature computation block 601 and the application block 602 whereas the second backpropagation process invoked by the regression loss block 605 may adjust the parameters of the student feature computation block 601. Accordingly, the parameters of each filter block in the student feature computation block 601, i.e., the (1-1)-th filter block to the (1-k)-th filter block, and each FUN block therein, i.e., the (2-1)-th up-sampling block to the (2-k)-th up-sampling block, may be adjusted by both the application loss block 603 and the regression loss block 605 using the application-specific losses and the additional regression losses. Hence, the learning performance of the device 600 may be more efficient.

FIG. 6B specifically illustrates details of the student feature computation block 601, the teacher feature computation block 604 and the regression loss block 605. A procedure for generating feature maps as illustrated in FIG. 4 is also demonstrated for the student feature computation block 601.

Referring to FIG. 6B, the teacher feature computation block 604 may include a plurality of filter blocks 6101, 610_2, 610_3, ..., and 610_k. As mentioned above and illustrated in FIG. 6B, the teacher feature computation block 604 and the student feature computation block 601 may receive the same input image and may perform one or more convolution operations thereon, but unlike the student feature computation block 601, the teacher feature computation block 604 may not include a down-sampling block and thus may perform the convolution operations without passing through the down-sampling block.

Specifically, the (T-1)-th filter block 610_1 receives the input image with the size and the channel of W×H×3 and performs a convolution operation thereon to thereby output the (T-1)-th feature map (T-1)FEAT with the size and the channel of W/2×H/2×C. Then, the (T-2)-th filter block 610_2 receives the (T-1)-th feature map (T-1)FEAT and performs a convolution operation thereon to thereby output the (T-2)-th feature map (T-2)FEAT with the size and the channel of W/4×H/4×2C. Likewise, the (T-3)-th filter block 610_3 receives the (T-2)-th feature map (T-2)FEAT and performs a convolution operation thereon to thereby generate the (T-3)-th feature map (T-3)FEAT with the size of W/8×H/8×4C. Accordingly, the (T-1)-th to the (T-k)-th feature maps are generated in turn.

As shown in FIG. 6B, the regression loss block 605 may produce the first regression loss by comparing the (2-1)-th feature map (2-1)FEAT to the (T-1)-th feature map (T-1)Feat, both of which have the same number of channels and size, e.g., W/2×H/2×C. Likewise, the regression loss block 605 may generate the second regression loss by comparing the (2-2)-th feature map. (2-2)FEAT to the (T-2)-th feature map (T-2)Feat, both of which have the same number of channels and size, e.g., W/4×H/4×2C, and so on. That is, the respective regression losses corresponding to each of the (2-1)-th to the (2-k)-th feature maps are calculated by the regression loss block 605. And the device 600 may allow parameters of at least part of the (1-1)-th to the (1-k)-th filter blocks and the (2-1)-th to the (2-k)-th up-sampling blocks to be adjusted during the second backpropagation process by using the regression losses. Whereas, the (T-1)-th filter block 610_1 to the (T-k)-th filter block 610_k of the teacher feature computation block 604 may use fixed parameters having been acquired during a pre-training process. The device 600 as shown in FIG. 6A may execute a testing process merely with the student feature computation block 601 and the application block 602 if the adjustment of the parameters is completed.

Figure 7:
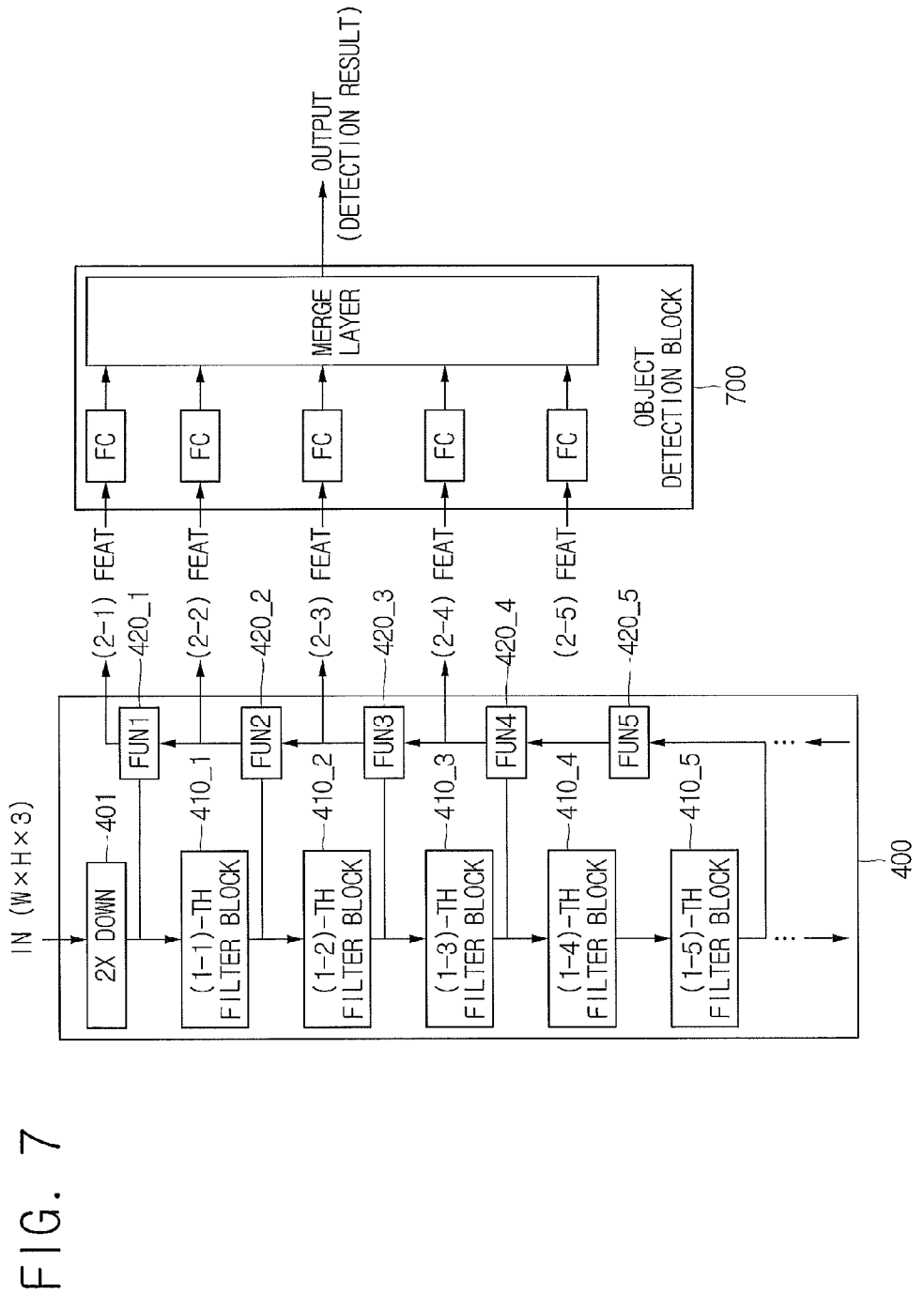
FIG. 7 is a block diagram of a device for detecting an object in accordance with one example embodiment of the present invention.

FIG. 7 is a block diagram of a device for detecting an object in accordance with one example embodiment of the present invention. As shown in FIG. 7, an object detection block 700 is provided as an example of the application block 602. Referring to FIG. 7, the feature maps, e.g., (2-1)FEAT, (2-2)FEAT, . . . , and (2-k)FEAT, generated by the feature computation block 400 are carried to the object detection block 700. The object detection block 700 may receive at least part of the feature maps from the feature computation block 400. In detail, FC layers within the object detection block 700 may perform particular operations, e.g., regression operations or classification operations, on the received feature maps to acquire interim results and may forward the interim results to a merge layer, to thereby generate the application-specific output. Herein, the application-specific output is a detection result for an object.

Referring to FIG. 7 again, the amount of computations is reduced for the feature computation block 400 in accordance with the present invention whereas the accuracy of the detection result is preserved. Herein, examples of the application block 602 may be semantic segmentation block or the object detection block 700 as illustrated in the FIG. 7.

As the present invention may be appreciated by those skilled in the art, input images described above, e.g. the training image or the test image, may be received and transferred by the communication part of the learning device and that of the testing device, and data for performing computations with feature maps may be held/maintained by the processor (and/or memory) thereof. The convolution operations, the deconvolution operations and the loss computations are mainly performed by the processor of the learning device and the testing device, but it is not limited thereto.

The present invention has an effect of reducing the computation time of the CNN by decreasing the size of the input image via applying the down-sampling operation.

Also, the present invention has another effect of reducing computation time of the CNN without sacrificing the accuracy of the application-specific output.

In addition, the present invention has another effect of improving computation speed of the CNN by reducing computation time of the CNN compared to conventional ones.

Besides, the present invention has still another effect of substantially reducing the number of channels of the feature maps generated by the up-sampling block in accordance with the present invention.

Further, the present invention has still another effect of improving performance of the learning process by using the losses acquired from the Application Loss Block and additional regression losses acquired from the Regression Loss Block.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A learning method for improving performance of a CNN by using feature up-sampling networks (FUN) included in a learning device, wherein the learning device includes (i) a down-sampling block for reducing a size of an input image; (ii) each of a (1-1)-th to a (1-k)-th filter blocks from which each of a (1-1)-th to a (1-k)-th feature maps is acquired by performing one or more convolution operations; (iii) a (2-k)-th to a (2-1)-th up-sampling blocks each of which correspondingly interacts with each of the (1-1)-th to the (1-k)-th filter blocks and thereby generates each of a (2-k)-th to a (2-1)-th feature maps; (iv) an application block for generating an application-specific output by using at least part of the (2-k)-th to the (2-1)-th feature maps; and (v) an application-specific loss block for computing a loss by comparing between the application-specific output generated by the application block and Ground Truth (GT), comprising steps of:

(a) the learning device, if the input image is obtained, allowing the down-sampling block to acquire a down-sampling image by applying a predetermined operation to the input image for reducing the size thereof;

(b) the learning device, if the down-sampling image is obtained, allowing each of the (1-1)-th to the (1-k)-th filter blocks to respectively acquire each of the (1-1)-th to the (1-k)-th feature maps by applying the one or more convolution operations to the down-sampling image;

(c) the learning device (I) allowing the (2-1)-th up-sampling block to (i) receive the down-sampling image from the down-sampling block, and (ii) receive the (2-2)-th feature map from the (2-2)-th up-sampling block, and then rescale a size of the (2-2)-th feature map to be identical to that of the down-sampling image and (iii) apply a certain operation to the down-sampling image and the (2-2)-th resealed feature map, thereby acquiring the (2-1)-th feature map and (II) allowing the (2-(M+1))-th up-sampling block to (i) receive the (1-M)-th feature map from the (1-M)-th filter block, and (ii) receive the (2-(M+2))-th feature map from the (2-(M+2))-th up-sampling block, and then rescale a size of the (2-(M+2))-th feature map to be identical to that of the (1-M)-th feature map and (iii) apply a certain operation to the (1-M)-th feature map and the (2-(M+2))-th resealed feature map in order to generate the (2-(M+1))-th feature map, thereby acquiring the (2-k)-th to the (2-2)-th feature maps, wherein M is an integer greater than or equal to 1; and (d) the learning device (i) allowing the application block to acquire the application-specific output by applying an application-specific operation to at least part of the (2-k)-th to the (2-1)-th feature maps and (ii) allowing the application-specific loss block to acquire the loss by comparing the application-specific output to the GT; and thereby adjusting parameters of at least part of the application block, the (2-k)-th to the (2-1)-th up-sampling blocks and the (1-1)-th to the (1-k)-th filter blocks by using the loss during a first backpropagation process.

2. The learning method of claim 1, wherein the learning device further includes (vi) a teacher encoding layer including a (T-1)-th to a (T-k)-th filter blocks respectively generating a (T-1)-th to a (T-k)-th feature maps whose respective sizes are corresponding to each of those of the (2-1)-th to the (2-k)-th feature maps and which are acquired by applying one or more convolution operations to the input image without passing through the down-sampling block and (vii) a regression loss block, and wherein the learning method further comprises a step of: (e) the learning device allows the regression loss block to generate regression losses by using each of the (2-1)-th to the (2-k)-th feature maps and each of the (T-1)-th to the (T-k)-th feature maps, and then allows parameters of at least part of the (1-1)-th to the (1-k)-th filter blocks and the (2-1)-th to the (2-k)-th up-sampling blocks to be adjusted by using the regression losses during a second backpropagation process.

3. The learning method of claim 2, wherein the (T-1)-th to the (T-k)-th filter blocks in the teacher encoding layer use fixed parameters acquired during a pre-training process.

4. The learning method of claim 1, wherein the learning device, at the step of (c), in case M is an integer greater than or equal to 1 and less than or equal to (k-2), allowing the (2-(M+1))-th up-sampling block to perform processes of (i) obtaining a (1-M)-th adjusted feature map whose number of channels is modified by a first filter in the (2-(M+1))-th up-sampling block applying a convolution operation to the (1-M)-th feature map; (ii) obtaining a (2-(M+2))-th adjusted feature map whose number of channels is modified by a second filter in the (2-(M+1))-th up-sampling block applying a convolution operation to the (2-(M+2))-th feature map; and then obtaining the (2-(M+2))-th resealed feature map by applying an up-sampling operation to the (2-(M+2))-th adjusted feature map; (iii) computing the (1-M)-th adjusted feature map with the (2-(M+2))-th resealed feature map in order to produce the (2-(M+1))-th feature map; and (iv) relaying to the (2-M)-th up-sampling block the (2-(M+1))-th feature map acquired from the (2-(M+1))-th up-sampling block, thereby acquiring the (2-(k-1))-th to the (2-2)-th feature maps.

5. The learning method of claim 4, wherein the learning device, at the step of (c), allowing the (2-1)-th up-sampling block to acquire the (2-1)-th feature map by performing processes of (i) obtaining an adjusted feature map of the down-sampling image whose number of channels is modified by the first filter in the (2-1)-th up-sampling block applying the convolution operation to the down-sampling image; (ii) obtaining a (2-2)-th adjusted feature map whose number of channels is modified by the second filter in the (2-1)-th up-sampling block applying the convolution operation to the (2-2)-th feature map; and then obtaining the (2-2)-th resealed feature map by applying the up-sampling operation to the (2-2)-th adjusted feature map; and (iii) computing the adjusted feature map for the down-sampling image with the (2-2)-th resealed feature map in order to produce the (2-1)-th feature map.

6. The learning method of claim 4, wherein the learning device, at the step of (c), allowing the (2-k)-th up-sampling block to acquire the (2-k)-th feature map by performing processes of (i) obtaining a (1-(k-1))-th adjusted feature map whose number of channels is modified by the first filter in the (2-k)-th up-sampling block applying the convolution operation to the (1-(k-1))-th feature map; (ii) obtaining a (1-k)-th resealed feature map by applying the up-sampling operation to the (1-k)-th feature map; (iii) computing the (1-(k-1))-th adjusted feature map with the (1-k)-th resealed feature map in order to produce the (2-k)-th feature map; and (iv) relaying to the (2-(k-1))-th up-sampling block the (2-k)-th feature map acquired from the (2-k)-th up-sampling block.

7. The learning method of claim 4, wherein the convolution operation of the first filter in the (2-(M+1))-th up-sampling block is an operation for adjusting the number of channels of the (1-M)-th feature map to be same as that of the (2-(M+2))-th adjusted feature map, and wherein the convolution operation using the first filter in the (2-1)-th up-sampling block is an operation for adjusting the number of channels of the down-sampling image to be same as the number of channels of the (2-2)-th adjusted feature map.

8. The learning method of claim 1, wherein the device, at the step of (b), applies a convolution operation to the down-sampling image acquired from the down-sampling block via the (1-1)-th filter block to obtain the (1-1)-th feature map, and then applies a convolution operation to the (1-M)-th feature map acquired from the (1-M)-the filter block via the (1-(M+1))-th filter block to obtain the (1-(M+1))-th feature map, where M is an integer from 2 to (k-1).

9. A testing method for applying operations to a test image as an input image by using a CNN with Feature Up-sampling Networks (FUN) included in a testing device to acquire an application-specific output, comprising steps of:
(a) the testing device acquiring the test image on the conditions that by using a learning device which includes (i) a down-sampling block for reducing a size of a training image; (ii) each of a (1-1)-th to a (1-k)-th filter blocks from which each of a (1-1)-th to a (1-k)-th feature maps is acquired by performing one or more convolution operations thereon; (iii) a (2-k)-th to a (2-1)-th up-sampling blocks each of which correspondingly interacts with each of the (1-1)-th to the (1-k)-th filter blocks; (iv) an application block for generating the application-specific output by using at least part of the (2-k)-th to the (2-1)-th feature maps; and (v) an application-specific loss block for computing a loss by comparing between the application-specific output generated by the application block and Ground Truth (GT), processes of (1) allowing the down-sampling block to acquire a down-sampling image for training by applying a predetermined operation to the training image for reducing the size thereof if the training image is obtained; (2) allowing each of the (1-1)-th to the (1-k)-th filter blocks to respectively acquire each of the (1-1)-th to the (1-k)-th feature maps for training by applying the one or more convolution operations to the down-sampling image for training if the down-sampling image for training is obtained; (3)(I) allowing the (2-1)-th up-sampling block to (i) receive the down-sampling image from the down-sampling block, (ii) receive the (2-2)-th feature map from the (2-2)-th up-sampling block, and then rescale a size of the (2-2)-th feature map to be identical to that of the down-sampling image, and (iii) apply a certain operation to the down-sampling image and the (2-2)-th resealed feature map, thereby acquiring the (2-1)-th feature map, and (II) allowing the (2-(M+1))-th up-sampling block to (i) receive the (1-M)-th feature map from the (1-M)-th filter block, (ii) receive the (2-(M+2))-th feature map from the (2-(M+2))-th up-sampling block, and then rescale a size of the (2-(M+2))-th feature map to be identical to that of the (1-M)-th feature map, and (iii) apply a certain operation to the (1-M)-th feature map and the (2-(M+2))-th resealed feature map in order to generate the (2-(M+1))-th feature map, thereby acquiring the (2-k)-th to the (2-2)-th feature maps, wherein M is an integer greater than or equal to one; and (4)(i) allowing the application block to acquire the application-specific output by applying an application-specific operation to at least part of the (2-k)-th to the (2-1)-th feature maps for training, and (ii) allowing the application-specific loss block to acquire the loss by comparing the application-specific output to the GT; and thereby adjusting parameters of at least part of the application block, the (2-k)-th to the (2-1)-th up-sampling blocks and the (1-1)-th to the (1-k)-th filter blocks by using the loss during a backpropagation process have been executed;
(b) the testing device, if the test image is obtained, allowing the down-sampling block to acquire a down-sampling image for testing by applying a predetermined operation to the test image for reducing the size thereof;
(c) the testing device, if the down-sampling image for testing is obtained, allowing each of the (1-1)-th to the (1-k)-th filter blocks to respectively acquire each of the (1-1)-th to the (1-k)-th feature maps for testing by applying the one or more convolution operations to the down-sampling image for testing;
(d) the testing device, (I) allowing the (2-1)-th up-sampling block to (i) receive the down-sampling image for testing from the down-sampling block, (ii) receive the (2-2)-th feature map for testing from the (2-2)-th up-sampling block, and then rescale a size of the (2-2)-th feature map for testing to be identical to that of the down-sampling image for testing, and (iii) apply a certain operation to the down-sampling image for testing and the (2-2)-th resealed feature map for testing, thereby acquiring the (2-1)-th feature map for testing, and (II) allowing the (2-(M+1))-th up-sampling block to (i) receive the (1-M)-th feature map for testing from the (1-M)-th filter block, (ii) receive the (2-(M+2))-th feature map for testing from the (2-(M+2))-th up-sampling block, and then rescale a size of the (2-(M+2))-th feature map for testing to be identical to that of the (1-M)-th feature map for testing, and (iii) apply a certain operation to the (1-M)-th feature map for testing and the (2-(M+2))-th resealed feature map for testing in order to generate the (2-(M+1))-th feature map for testing, thereby acquiring the (2-k)-th to the (2-2)-th feature maps for testing, wherein M is an integer greater than or equal to one; and
(e) the testing device allowing the application block to acquire the application-specific output by applying an application-specific operation to at least part of the (2-k)-th to the (2-1)-th feature maps for testing.

10. The testing method of claim 9, wherein the testing device, at the step of (d), if M is an integer greater than or equal to 1 and less than or equal to (k-2), allowing the (2-(M+1))-th up-sampling block to perform processes of (i) obtaining a (1-M)-th adjusted feature map for testing whose number of channels is modified by a first filter in the (2-(M+1))-th up-sampling block applying a convolution operation to the (1-M)-th feature map for testing; (ii) obtaining a (2-(M+2))-th adjusted feature map for testing whose number of channels is modified by a second filter in the (2-(M+1))-th up-sampling block applying a convolution operation to the (2-(M+2))-th feature map for testing; and then obtaining the (2-(M+2))-th resealed feature map for testing by applying an up-sampling operation to the (2-(M+2))-th adjusted feature map for testing; (iii) computing the (1-M)-th adjusted feature map for testing with the (2-(M+2))-th resealed feature map for testing; and (iv) relaying the (2-(M+1))-th feature map for testing to the (2-M)-th up-sampling block, thereby acquiring the (2-(k-1))-th to the (2-2)-th feature maps for testing.

11. The testing method of claim 10, wherein the testing device, at the step of (d), allowing the (2-1)-th up-sampling block to perform processes of (i) obtaining an adjusted feature map of the down-sampling image for testing whose number of channels is modified by the first filter in the (2-1)-th up-sampling block applying the convolution operation to the down-sampling image for testing; (ii) obtaining a (2-2)-th adjusted feature map for testing whose number of channels is modified by the second filter in the (2-1)-th up-sampling block applying the convolution operation to the (2-2)-th feature map for testing; and then obtaining the (2-2)-th resealed feature map for testing by applying the up-sampling operation to the (2-2)-th adjusted feature map for testing; and (iii) computing the adjusted feature map of the down-sampling image for testing with the (2-2)-th resealed feature map for testing in order to produce the (2-1)-th feature map for testing.

12. The testing method of claim 10, wherein the testing device, at the step of (d), allowing the (2-k)-th up-sampling block to perform processes of (i) obtaining a (1-(k-1))-th adjusted feature map for testing whose number of channels is modified by the first filter in the (2-k)-th up-sampling block applying the convolution operation to the (1-(k-1))-th feature map for testing; (ii) obtaining a (1-k)-th resealed feature map for testing by applying the up-sampling operation to the (1-k)-th feature map for testing; (iii) computing the (1-(k-1))-th adjusted feature map for testing with the (1-k)-th resealed feature map for testing in order to produce the (2-k)-th feature map for testing; and (iv) relaying to the (2-(k-1))-th up-sampling block the (2-k)-th feature map for testing acquired from the (2-k)-th up-sampling block.

13. A learning device for improving performance of a CNN by using Feature Up-sampling Networks (FUN), wherein the learning device includes (i) a down-sampling block for reducing a size of a training image as an input image; (ii) each of a (1-1)-th to a (1-k)-th filter blocks from which each of a (1-1)-th to a (1-k)-th feature maps is acquired by performing one or more convolution operations; (iii) a (2-k)-th to a (2-1)-th up-sampling blocks each of which correspondingly interacts with each of the (1-1)-th to the (1-k)-th filter blocks and thereby generates each of a (2-k)-th to a (2-1)-th feature maps; (iv) an application block for generating an application-specific output by using at least part of the (2-k)-th to the (2-1)-th feature maps; and (v) an application-specific loss block for computing a loss by comparing between the application-specific output generated by the application block and Ground Truth (GT), comprising:

a communication part for receiving the training image; and a processor for performing processes of (1) allowing, if the input image is obtained, the down-sampling block to acquire a down-sampling image by applying a predetermined operation to the input image for reducing the size thereof; (2) allowing, if the down-sampling image is obtained, each of the (1-1)-th to the (1-k)-th filter blocks to respectively acquire each of the (1-1)-th to the (1-k)-th feature maps by applying the one or more convolution operations to the down-sampling image; (3)(I) allowing the (2-1)-th up-sampling block to (i) receive the down-sampling image from the down-sampling block, (ii) receive the (2-2)-th feature map from the (2-2)-th up-sampling block, and then rescale the size of the (2-2)-th feature map to be identical to that of the down-sampling image, and (iii) apply a certain operation to the down-sampling image and the (2-2)-th resealed feature map, thereby acquiring the (2-1)-th feature map, and (II) allowing the (2-(M+1))-th up-sampling block to (i) receive the (1-M)-th feature map from the (1-M)-th filter block, (ii) receive the (2-(M+2))-th feature map from the (2-(M+2))-th up-sampling block, and then rescale a size of the (2-(M+2))-th feature map to be identical to that of the (1-M)-th feature map, and (iii) apply a certain operation to the (1-M)-th feature map and the (2-(M+2))-th resealed feature map in order to generate the (2-(M+1))-th feature map, thereby acquiring the (2-k)-th to the (2-2)-th feature maps, wherein M is an integer greater than or equal to one; and (4)(i) allowing the application block to acquire the application-specific output by applying an application-specific operation to at least part of the (2-k)-th to the (2-1)-th feature maps and (ii) allowing the application-specific loss block to acquire the loss by comparing the application-specific output to the GT; and thereby adjusting parameters of at least part of the application block, the (2-k)-th to the (2-1)-th up-sampling blocks and the (1-1)-th to the (1-k)-th filter blocks by using the loss during a first backpropagation process.

14. The learning device of claim 13, wherein (i) a teacher encoding layer including a (T-1)-th to a (T-k)-th filter blocks respectively generating a (T-1)-th to a (T-k)-th feature maps whose respective sizes are corresponding to each of those of the (2-1)-th to the (2-k)-th feature maps and which are acquired by applying one or more convolution operations to the input image without passing through the down-sampling block, and (ii) a regression loss block are further included, and wherein the processor is further configured to perform a process of allowing the regression loss block to generate regression losses by using each of the (2-1)-th to the (2-k)-th feature maps and each of the (T-1)-th to the (T-k)-th feature maps, and then allowing parameters of at least part of the (1-1)-th to the (1-k)-th filter blocks and the (2-1)-th to the (2-k)-th up-sampling blocks to be adjusted by using the regression losses during a second backpropagation process.

15. The learning device of claim 14, wherein the (T-1)-th to the (T-k)-th filter blocks in the teacher encoding layer use fixed parameters acquired during a pre-training process.

16. The learning device of claim 13, wherein, at the process of (3), in case M is an integer greater than or equal to 1 and less than or equal to (k-2), the processor is configured to allow the (2-(M+1))-th up-sampling block to perform processes of (i) obtaining a (1-M)-th adjusted feature map whose number of channels is modified by a first filter in the (2-(M+1))-th up-sampling block applying a convolution operation to the (1-M)-th feature map; (ii) obtaining a (2-(M+2))-th adjusted feature map whose number of channels is modified by a second filter in the (2-(M+1))-th up-sampling block applying a convolution operation to the (2-(M+2))-th feature map; and then obtaining the (2-(M+2))-th resealed feature map by applying an up-sampling operation to the (2-(M+2))-th adjusted feature map; (iii) computing the (1-M)-th adjusted feature map with the (2-(M+2))-th resealed feature map in order to produce the (2-(M+1))-th feature map; and (iv) relaying to the (2-M)-th up-sampling block the (2-(M+1))-th feature map acquired from the (2-(M+1))-th up-sampling block, thereby acquiring the (2-(k-1))-th to the (2-2)-th feature maps.

17. The learning device of claim 16, wherein, at the process of (3), the processor is configured to allow the (2-1)-th up-sampling block to acquire the (2-1)-th feature map by performing processes of (i) obtaining an adjusted feature map of the down-sampling image whose number of channels is modified by the first filter in the (2-1)-th up-sampling block applying the convolution operation to the down-sampling image; (ii) obtaining a (2-2)-th adjusted feature map whose number of channels is modified by the second filter in the (2-1)-th up-sampling block applying the convolution operation to the (2-2)-th feature map; and then obtaining the (2-2)-th resealed feature map by applying the up-sampling operation to the (2-2)-th adjusted feature map; and (iii) computing the adjusted feature map for the down-sampling image with the (2-2)-th resealed feature map in order to produce the (2-1)-th feature map.

18. The learning device of claim 16, wherein, at the process of (3), the processor is configured to allow the (2-k)-th up-sampling block to acquire the (2-k)-th feature map by performing processes of (i) obtaining a (1-(k-1))-th adjusted feature map whose number of channels is modified by the first filter in the (2-k)-th up-sampling block applying the convolution operation to the (1-(k-1))-th feature map; (ii) obtaining a (1-k)-th resealed feature map by applying the up-sampling operation to the (1-k)-th feature map; (iii) computing the (1-(k-1))-th adjusted feature map with the (1-k)-th resealed feature map in order to produce the (2-k)-th feature map; and (iv) relaying to the (2-(k-1))-th up-sampling block the (2-k)-th feature map acquired from the (2-k)-th up-sampling block.

19. The learning device of claim 16, wherein the convolution operation of the first filter in the (2-(M+1))-th up-sampling block is an operation for adjusting the number of channels of the (1-M)-th feature map to be same as that of the (2-(M+2))-th adjusted feature map, and wherein the convolution operation using the first filter in the (2-1)-th up-sampling block is an operation for adjusting the number of channels of the down-sampling image to be same as the number of channels of the (2-2)-th adjusted feature map.

20. The learning device of claim 13, wherein, at the process of (2), the processor is configured to apply a convolution operation to the down-sampling image acquired from the down-sampling block via the (1-1)-th filter block to obtain the (1-1)-th feature map, and then to apply a convolution operation to the (1-M)-th feature map acquired from the (1-M)-the filter block via the (1-(M+1))-th filter block to obtain the (1-(M+1))-th feature map, where M is an integer from 2 to (k-1).

21. A testing device for applying operations to a test image as an input image by using a CNN with Feature Up-sampling Networks (FUN) to acquire an application-specific output, comprising:
a communication part for receiving the test image, on the conditions that by using a learning device which includes (i) a down-sampling block for reducing a size of a training image; (ii) each of a (1-1)-th to a (1-k)-th filter blocks from which each of a (1-1)-th to a (1-k)-th feature maps is acquired by performing one or more convolution operations thereon; (iii) a (2-k)-th to a (2-1)-th up-sampling blocks each of which correspondingly interacts with each of the (1-1)-th to the (1-k)-th filter blocks; (iv) an application block for generating the application-specific output by using at least part of the (2-k)-th to the (2-1)-th feature maps; and (v) an application-specific loss block for computing a loss by comparing between the application-specific output generated by the application block and Ground Truth (GT), processes of (1) allowing the down-sampling block to acquire a down-sampling image for training by applying a predetermined operation to the training image for reducing the size thereof if the training image is obtained; (2) allowing each of the (1-1)-th to the (1-k)-th filter blocks to respectively acquire each of the (1-1)-th to the (1-k)-th feature maps for training by applying the one or more convolution operations to the down-sampling image for training if the down-sampling image for training is obtained; (3)(I) allowing the (2-1)-th up-sampling block to (i) receive the down-sampling image from the down-sampling block, (ii) receive the (2-2)-th feature map from the (2-2)-th up-sampling block, and then rescale a size of the (2-2)-th feature map to be identical to that of the down-sampling image, and (iii) apply a certain operation to the down-sampling image and the resealed (2-2)-th feature map, thereby acquiring the (2-1)-th feature map, and (II) allowing the (2-(M+1))-th up-sampling block to (i) receive the (1-M)-th feature map from the (1-M)-th filter block, (ii) receive the (2-(M+2))-th feature map from the (2-(M+2))-th up-sampling block, and then rescale a size of the (2-(M+2))-th feature map to be identical to that of the (1-M)-th feature map, and (iii) apply a certain operation to the (1-M)-th feature map and the (2-(M+2))-th resealed feature map in order to generate the (2-(M+1))-th feature map, thereby acquiring the (2-k)-th to the (2-2)-th feature maps, wherein M is an integer greater than or equal to one; and (4)(i) allowing the application block to acquire the application-specific output by applying an application-specific operation to at least part of the (2-k)-th to the (2-1)-th feature maps for training, and (ii) allowing the application-specific loss block to acquire the loss by comparing the application-specific output to the GT; and thereby adjusting parameters of at least part of the application block, the (2-k)-th to the (2-1)-th up-sampling blocks and the (1-1)-th to the (1-k)-th filter blocks by using the loss during a backpropagation process have been executed; and a processor for performing processes of: (1) allowing the down-sampling block to acquire a down-sampling image for testing by applying a predetermined operation to the test image for reducing the size thereof if the test image is obtained; (2) allowing each of the (1-1)-th to the (1-k)-th filter blocks to respectively acquire each of the (1-1)-th to the (1-k)-th feature maps for testing by applying the one or more convolution operations to the down-sampling image for testing if the down-sampling image for testing is obtained; (3)(I) allowing the (2-1)-th up-sampling block to (i) receive the down-sampling image for testing from the down-sampling block, (ii) receive the (2-2)-th feature map for testing from the (2-2)-th up-sampling block, and then rescale a size of the (2-2)-th feature map for testing to be identical to that of the down-sampling image for testing, and (iii) apply a certain operation to the down-sampling image for testing and the (2-2)-th resealed feature map for testing, thereby acquiring the (2-1)-th feature map for testing, and (II) allowing the (2-(M+1))-th up-sampling block to (i) receive the (1-M)-th feature map for testing from the (1-M)-th filter block, (ii) receive the (2-(M+2))-th feature map for testing from the (2-(M+2))-th up-sampling block, and then rescale a size of the (2-(M+2))-th feature map for testing to be identical to that of the (1-M)-th feature map for testing, and (iii) apply a certain operation to the (1-M)-th feature map for testing and the (2-(M+2))-th resealed feature map for testing in order to generate the (2-(M+1))-th feature map for testing, thereby acquiring the (2-k)-th to the (2-2)-th feature maps for testing, wherein M is an integer greater than or equal to one; and (4) allowing the application block to acquire the application-specific output by applying an application-specific operation to at least part of the (2-k)-th to the (2-1)-th feature maps for testing.

22. The testing device of claim 21, wherein, at the process of (4), if M is an integer greater than or equal to 1 and less than or equal to (k-2), the processor is configured to allow the (2-(M+1))-th up-sampling block to perform processes of (i) obtaining a (1-M)-th adjusted feature map for testing whose number of channels is modified by a first filter in the (2-(M+1))-th up-sampling block applying a convolution operation to the (1-M)-th feature map for testing; (ii) obtaining a (2-(M+2))-th adjusted feature map for testing whose number of channels is modified by a second filter in the (2-(M+1))-th up-sampling block applying a convolution operation to the (2-(M+2))-th feature map for testing; and then obtaining the (2-(M+2))-th resealed feature map for testing by applying an up-sampling operation to the (2-(M+2))-th adjusted feature map for testing; (iii) computing the (1-M)-th adjusted feature map for testing with the (2-(M+2))-th resealed feature map for testing; and (iv) relaying the (2-(M+1))-th feature map for testing to the (2-M)-th up-sampling block, thereby acquiring the (2-(k-1))-th to the (2-2)-th feature maps for testing.

23. The testing device of claim 22, wherein, at the process of (4), the processor is configured to allow the (2-1)-th up-sampling block to perform processes of (i) obtaining an adjusted feature map of the down-sampling image for testing whose number of channels is modified by the first filter in the (2-1)-th up-sampling block applying the convolution operation to the down-sampling image for testing; (ii) obtaining a (2-2)-th adjusted feature map for testing whose number of channels is modified by the second filter in the (2-1)-th up-sampling block applying the convolution operation to the (2-2)-th feature map for testing; and then obtaining the (2-2)-th rescaled feature map for testing by applying the up-sampling operation to the (2-2)-th adjusted feature map for testing; and (iii) computing the adjusted feature map of the down-sampling image for testing with the (2-2)-th resealed feature map for testing in order to generate the (2-1)-th feature map for testing.

24. The testing device of claim 22, wherein, at the process of (4), the processor is configured to allow the (2-k)-th up-sampling block to perform processes of (i) obtaining a (1-(k-1))-th adjusted feature map for testing whose number of channels is modified by the first filter in the (2-k)-th up-sampling block applying the convolution operation to the (1-(k-1))-th feature map for testing; (ii) obtaining a (1-k)-th rescaled feature map for testing by applying the up-sampling operation to the (1-k)-th feature map for testing; (iii) computing the (1-(k-1))-th adjusted feature map for testing with the (1-k)-th rescaled feature map for testing in order to produce the (2-k)-th feature map for testing; and (iv) relaying to the (2-(k-1))-th up-sampling block the (2-k)-th feature map for testing acquired from the (2-k)-th up-sampling block.

\* \* \* \* \*